(12) United States Patent
Gupta

(10) Patent No.: US 10,823,880 B1
(45) Date of Patent: Nov. 3, 2020

(54) SUBSURFACE EXPLORATION USING LOAD TESTS ON SHORT MODEL PILES AT VARIOUS DEPTHS OF A SOIL DEPOSIT FOR DETERMINING LOAD-SETTLEMENT RELATIONSHIP AND ENGINEERING PROPERTIES OF SOILS AND INTERMEDIATE GEOMATERIALS

(71) Applicant: Ramesh Chandra Gupta, Ashburn, VA (US)

(72) Inventor: Ramesh Chandra Gupta, Ashburn, VA (US)

( * ) Notice: Subject to any disclaimer, the term of this patent is extended or adjusted under 35 U.S.C. 154(b) by 0 days.

(21) Appl. No.: 16/814,637

(22) Filed: Mar. 10, 2020

(51) Int. Cl.
*G01V 99/00* (2009.01)
*G01V 1/30* (2006.01)

(52) U.S. Cl.
CPC ............ *G01V 99/005* (2013.01); *G01V 1/306* (2013.01)

(58) Field of Classification Search
CPC ....... G01N 33/24; G01V 99/005; G01V 1/306
See application file for complete search history.

(56) References Cited

U.S. PATENT DOCUMENTS

| 6,236,941 B1 * | 5/2001 | Kram | G01N 33/24 702/12 |
| 6,349,590 B1 * | 2/2002 | Wai | E02D 33/00 73/84 |
| 2020/0109533 A1 * | 4/2020 | Mulla | E02D 1/022 |

* cited by examiner

*Primary Examiner* — Bryan Bui

(57) ABSTRACT

Subsurface exploration using In-Situ tests such as SPT, CPT, CPTu, DMT, and PMT predicts inaccurately engineering properties of soils and intermediate geomaterials and thereby predicts incorrect load-settlement relationship of piles; variations or errors in engineering properties predicted by one empirical correlation to another correlation could be up to 50% or greater. For soft to very soft soils, engineering properties cannot be predicted as the SPT only provides information such as WOR and WOH. To overcome this problem, the invention of the application consists of performing subsurface exploration using load tests on short model piles with or without instrumentation at various depths of a soil deposit for determining accurately the above-mentioned properties. For very soft soils, a hung balance is used to hang drill rods and short model pile from a drill rig boom or from a platform with soil anchors to prevent its overturning, and then perform the load test.

14 Claims, 9 Drawing Sheets

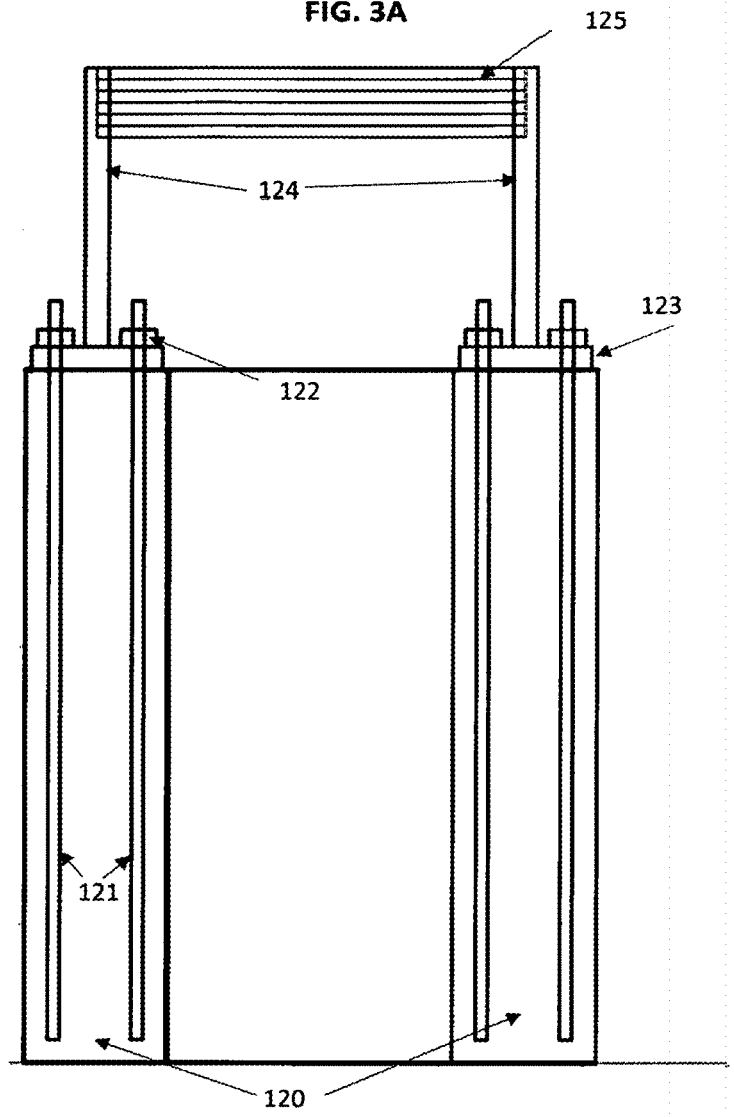
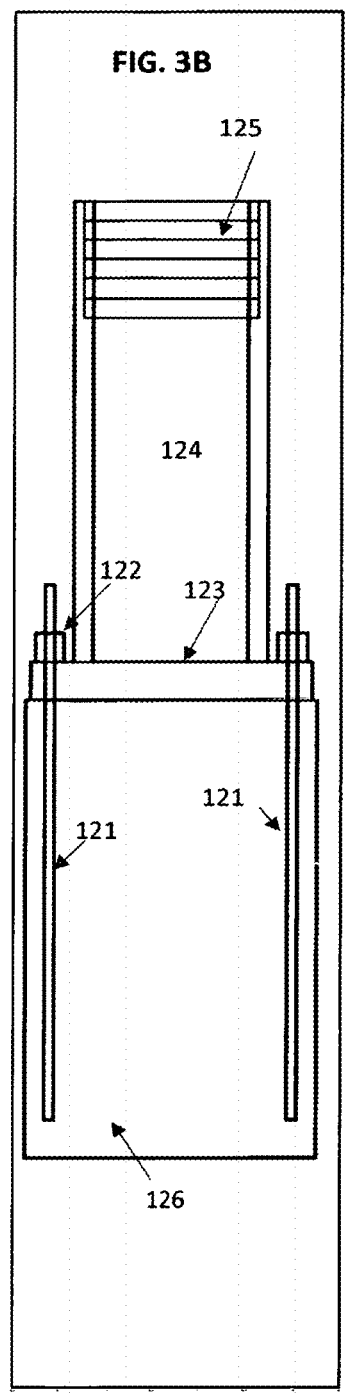

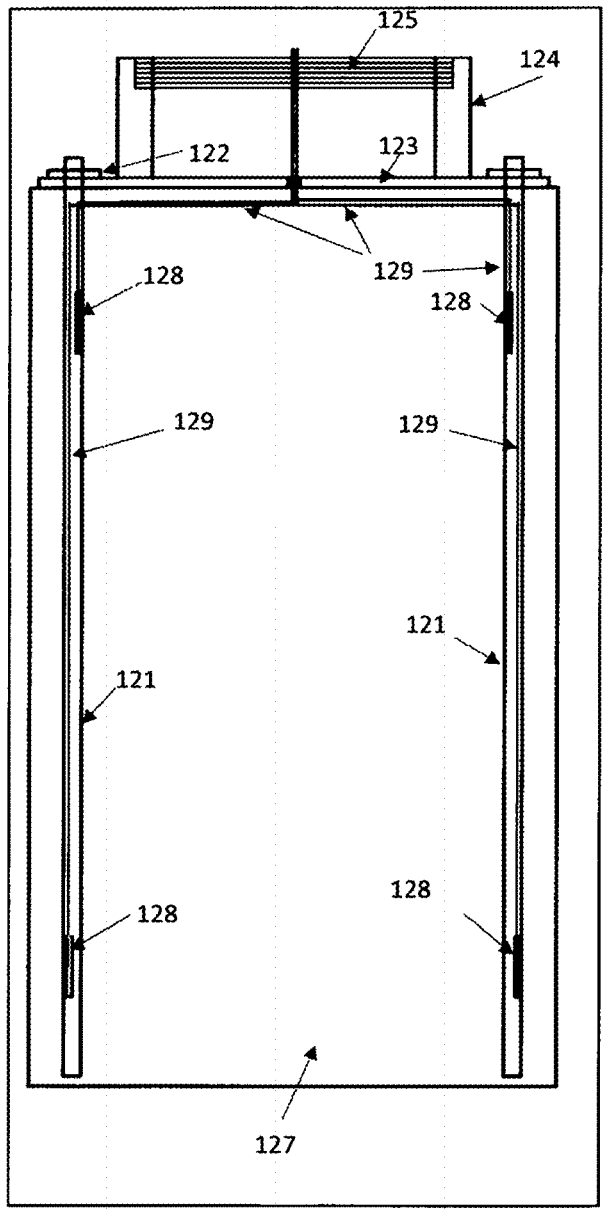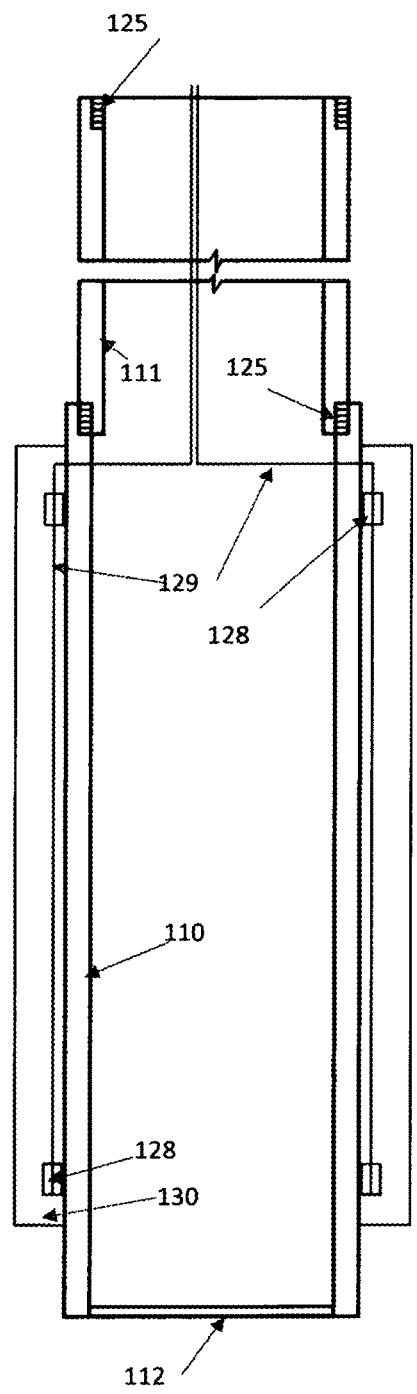

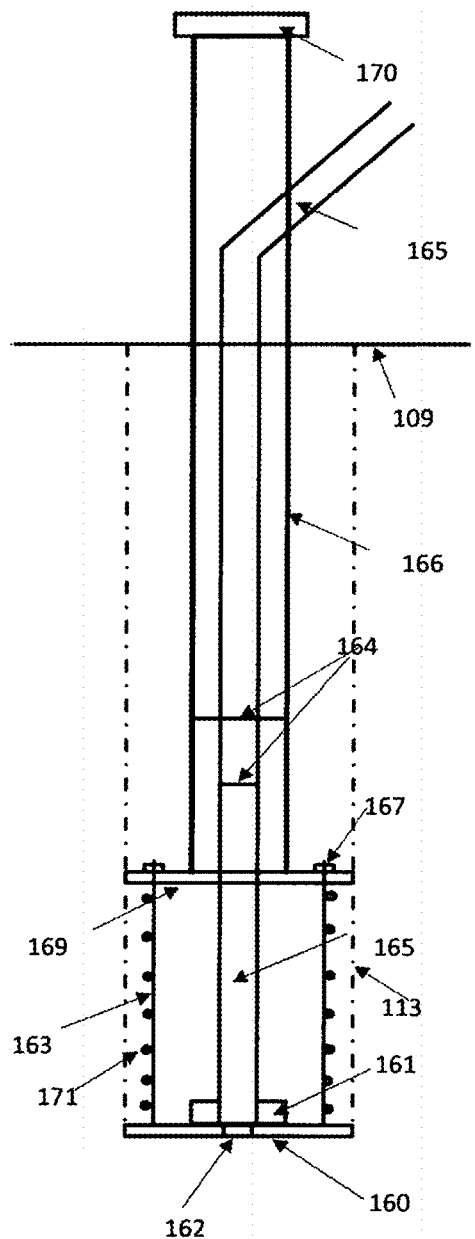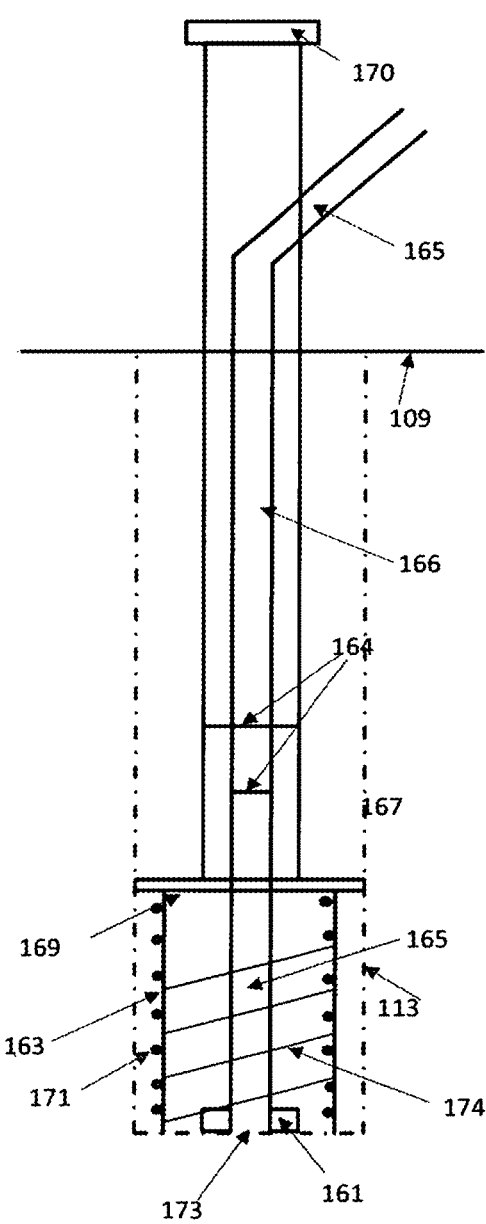

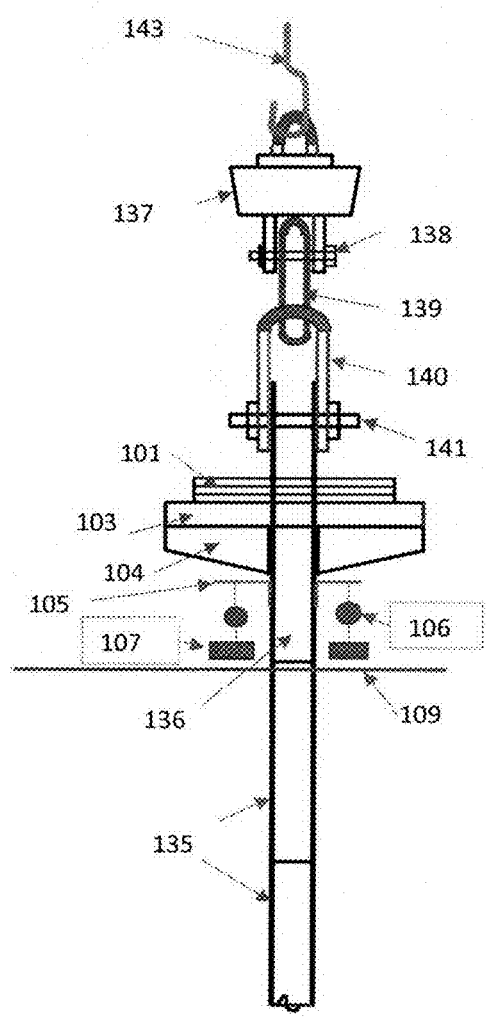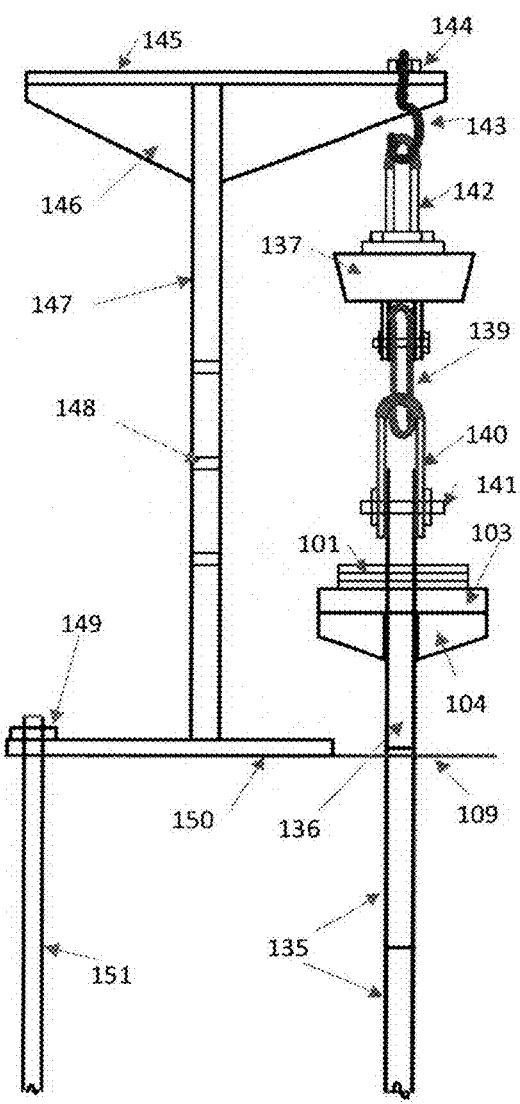

SUBSURFACE EXPLORATION USING LOAD TESTS ON SHORT MODEL PILES AT VARIOUS DEPTHS OF A SOIL DEPOSIT FOR DETERMINING LOAD-SETTLEMENT RELATIONSHIP AND ENGINEERING PROPERTIES OF SOILS AND INTERMEDIATE GEOMATERIALS

TECHNICAL FIELD

This application is for applying for a utility patent in the technical field which includes civil engineering and geotechnical engineering for subsurface exploration and testing. This specification/description is complete-in-itself. This invention is not sponsored or supported by federally sponsored research or development. This invention has been developed by me, Dr. Ramesh Chandra Gupta, Ph. D., P.E, President and Sole Owner of SAR6 INC., solely at my own cost and time. There is no joint research agreement with anyone. As stated earlier, this research/invention was conceived and completed solely by me (Dr. Ramesh C. Gupta, the inventor). It is my individual research work for this invention. The inventor, Dr. Ramesh Chandra Gupta is a Citizen of the United States of America.

BACKGROUND OF INVENTION

Subsurface investigation or subsurface exploration is generally conducted to determine subsurface soil profile and engineering properties of soils, intermediate geomaterials and rock, using Standard Penetration Tests (SPT) or core drilling, Cone Penetration Tests (CPT) or Piezocone Penetration Test (CPTu) or Dilatometer Tests (DMT) or Pressuremeter Tests (PMT), etc. Engineering properties are determined using empirical or semi-empirical correlations developed by various researchers and investigators, using the data obtained from the above mentioned in-situ tests, which were conducted by them in their respective areas or regions of the world. It has been seen that the engineering properties determined by one correlation when compared with other correlation or correlations could vary up to 50% or more, in such situations, a geotechnical engineer has no choice, but assign values of engineering properties based on local practice and his own experience.

The invention presented in this application, consists of subsurface exploration to determine load-settlement behavior and engineering properties of soils and intermediate geotechnical materials by performing load tests on short model piles at various depths in each layer of a soil deposit. The engineering properties shall be accurately determined for each layer, using theoretical formulations by back calculations, from the side friction versus relative settlement between soil and the pile curves and base resistance versus base settlement curves determined from the load tests on short model piles. The empirical or semiempirical relations developed from the above mentioned in-situ tests (SPT, CPT, CPTu, PMT and DMT, etc.) can be or shall be corrected when any of load tests on the short model pile are conducted at the same site or in the vicinity of that site, generally consisting of about the same subsurface profile or geological characteristics. In fact, the engineering properties of soils and intermediate geomaterials are required to calculate load-settlement behavior of soils, peak side friction, peak base resistance and ultimate capacity of deep foundations consisting of pile, drilled shafts, micro-piles, etc. This information will be directly available from the load tests on the short model piles, performed at various depths of a soil deposit. The load-settlement behavior of the full length of the deep foundation can be or shall be accurately determined from the individual load tests on short model piles performed at various depths of the soil deposit (Gupta 2012, 2013, 2014, 2015). The determination of the engineering properties of soils shall be or can be used for various other analyses such as seismic analyses etc., and for comparing with other testing methods, including making a record for academic and research studies.

SUMMARY OF INVENTION (a) Technical Problem with Existing Geotechnical Test Methods Subsurface investigation or exploration is conducted using in-situ tests, such as SPT, CPT, CPTu with or without seismic cone, PMT, DMT etc. For designing foundations of structurers for a project, a detailed soil investigation or soil exploration is initiated which generally consists of penetration tests, sounding tests and also extracting soil specimen from various depths for performing laboratory tests. For important projects, pile load tests on full length piles are also conducted to verify the load capacity. Sounding tests such as various types of geophysical tests are also performed at sites of important structures. The subsurface investigation using some of the above mentioned in-situ tests are explained below:

STANDARD PENETRATION TEST (SPT): The most widely used penetration test is the "SPT", which consists of driving a split spoon into the ground by dropping a hammer weighing140 lbs. (63.5 kg) by 30 inches (0.762 m) generally in about 5 feet (1.5 m) intervals and the penetration resistance (N-value) is reported in number of blows to drive the spoon in two increments of 6" (0.152 m), i.e. in all 1 foot (0.304 m). Indeed, this is also a load test loading to failure of soil by drop of the hammer. Soil parameters and soil properties are determined using empirical correlations with N-values. The correlations are very approximate and can have large variation. The SPTs should be used only as an approximation in conjunction with other methods of exploration (Lambe and Whitman, 1969).

CONE PENETRATION TEST (CPT or CPTu): The CPT consists of pushing a series of cylindrical rods with cone at the base into the soil at a constant rate of 2 cm/second. Continuous measurements of penetration resistance on the cone tip and friction on friction sleeve (and pore-water pressures for CPTu) are recorded. The penetration of soil by the cone penetrometer results in instant failure of soil and creates peak stress conditions of soil as it advances. The continuous profiling of CPT or CPTu allows the user to visualize the stratigraphy, to evaluate the soil type, to approximately estimate large numbers of fundamental soil parameters by use of empirical or semi-empirical correlations, and also to directly design shallow and deep foundations subjected to vertical loads. Although CPT or CPTu is a test with advanced technology, the limitation and shortcoming of this test is that all soil properties are estimated based on the empirical correlations. The soil is continuously sheared to failure during cone penetration, and therefore it becomes necessary to estimate elastic properties of the soil by empirical correlations. The soil properties determined from empirical correlations developed by various investigators and researchers can vary by a factor up to 50 or more.

DILATOMETER TEST (DMT): The DMT consists of pushing a flat blade located at the end of a series of rods (Marchetti, 1982). In this test also, fails instantly, and therefore, elastic properties are determined by correlations.

Based on the DMT soundings mostly in European countries, the empirical correlations with the A and B readings taken during DMT soundings and coefficient of earth pressure at rest ($K_o$), soil classification, unit weight, drained friction angle ($\phi'$) of cohesionless soils, drained constraint modulus (M), elastic modulus (E), Shear Modulus (G), undrained shear strength ($s_u$) and overconsolidation ratio (OCR), have been developed (Marchetti, 1980), primarily based on tri-axial compression tests and other tests in the laboratory on extracted sample from ground at selected depth. Besides other shortcomings, the primary short coming is that the correlations initially developed in one region are to be used throughout the world where geologic and geotechnical conditions may be quite different.

BOREHOLE PRESSUREMETER TEST (PMT) and SELF BORING PRESSURE METER TEST (SBPMT): The PMT is an in-situ test (Menard, 1956), where a carefully prepared borehole augured, which is generally not over 10 percent-oversize (Bowles, 1988). The pressuremeter probe consisting of three parts (top guard cell, measuring cell and bottom guard cell) is then inserted and expanded in the larger cavity than the size of the pressuremeter. In the latest model (Texas A&M pressuremeter), top and bottom guard cell have been eliminated by increasing the length of measuring cell by more than 6 times its diameter. When using drilling-mud to stabilize the hole, there is possibility of a mud layer being trapped between the cell membrane and the soil. Another factor of considerable concern is that the soil tends to expand into the cavity when the hole is opened so that the test often has considerable disturbance effects. Therefore, soil properties are primarily determined based on empirical correlations for determining soil properties are by comparing the PMT results with soil properties determined by other test methods or by laboratory tests on undisturbed samples extracted from the depth where pressuremeter test is performed. To overcome the problems of hole preparation and soil expansion, the SBPMT was simultaneously developed in France (Bagauelin and Jezequel, 1978) and England (Wroth, 1975). The SBPMT is even more complex and requires a great deal of experience and although the SBPMT was developed more than 40 years ago, and provides better results for soil properties, in United States and in other parts of the world, its use is quite limited.

TRIAXIAL SHEAR TESTS, ONE-DIMENSIONAL CONSOLIDATION TEST and THREE-DIMENSIONAL CONSOLIDATION TESTS: These tests are performed in laboratory on undisturbed samples of cohesive soils extracted from the ground by Shelby tubes or by undisturbed sampling methods or on disturbed or remolded samples of both cohesive and cohesionless soils. Undisturbed samples of cohesionless soils such as sands cannot be extracted from any depth from the ground, unless freezing methods are used, which are very costly and very seldom used that too only for research. Therefore, triaxial compression tests are always done in remolded or recompacted samples. Even undisturbed samples are somewhat disturbed both during sampling and specimen preparation in the laboratory and the confining stress which exist in samples in the ground is lost when coming out of ground, bringing another factor of inaccuracies in the results. To overcome bulging of cylindrical specimen during triaxial compression tests, the expandable jacket (Gupta, 2016, 2018 has been developed and the research with use of the expandable jacket is underway. To overcome the shortcomings of one-dimensional consolidation test, three-dimensional consolidation tests have been developed (Gupta, 2017, 2018) and the research on this new test is underway.

VERY SOFT SOILS: When very soft soils are underlain on a site such as in coastal regions etc., SPT or CPT rods continue to sink, and therefore, no SPT "N" values can be obtained and the geotechnical engineer or his driller assigns it as weight of rod (WOR) or weight of hammer (WOH). On some sites, hundreds of feet (meters) of such soils are underlain and geotechnical engineer is able to get only limited information such as WOR or WHO, even though it is well known that shear strength even in such soils increases with depth, but we continue to get no numerical information other than "WOR". Although, the shear strength increases with depth, because weight of rod also increases with increase in length, the geotechnical engineer continues to receive no other information other than WOR. The qc values measured in soft to very soft soils are within the accuracy limit which is about 0.50% of full scale.

LOAD TESTS ON FULL LENGTH PILES: Load tests are conducted on full length of piles, drilled shafts and other types of deep foundations (either with or without any instrumentation), to determine ultimate pile capacity to support foundation loads and load-settlement characteristics of soils and geomaterials in accordance with ASTM Designation D 1143/d 1143M (or Standards regulated by various countries). For shallow foundations, plate load tests have been conducted. The Load tests on piles and drilled shafts without any instrumentation provide only the ultimate capacity and load versus pile tip settlement, whereas instrumented piles or drilled shafts provide load-transfer behavior, ultimate side friction, ultimate end bearing resistance, side friction versus relative settlement of a pile segment between two tell-tales or strain gages located at various depths of a pile with respect to the soil and end bearing resistance versus base settlement. The accuracy of the above properties from the instrumented load tests is dependent on the accuracy of the determined or assumed modulus of elasticity of the pile segments and in case of concrete piles on the uniformity and consistency of deposited concrete of the pile or drilled shaft throughout its length, accuracy of the determined strength of the concrete on the date of the load test and finally the accuracy of the strain gages or tell-tales. In many cases, the tell tales or strain gages either do not work or become defective giving incorrect and erratic readings causing the load test program unsuccessful to achieve the above-mentioned objectives. The load tests on piles costs generally in the range generally between about $20000 and $60000, while those on instrumented piles or drilled shafts costs generally in the range between about $50000 and $150000. The load tests are performed generally during construction and never or very seldom during subsurface investigation or design stage.

GEOPHYSICAL TESTS: The results obtained from these tests are very approximate. An effort is needed to develop analysis methods accurate enough for the design of structures.

In $21^{st}$ century, it is important to overcome all these $20^{th}$ century problems and inaccuracies. This invention invented in 21st century will overcome these problems and will provide accurate values.

(b) Solution to Problem and Advantageous Effects of Invention

Geotechnical testing and engineering methods are considered as a state-of-practice and not as state-of-science. Primary reason is that the elastic soil properties or soil properties for design are not determined directly for the load range in which a structure is expected to experience load during its life from the presently available soil exploration or investigation test methods, but are determined from the failure of soil under the load applied during the above-mentioned tests by use of applying a factor of safety etc. No direct information about elastic properties are obtained from any of the in-situ test. The primary need is to directly determine elastic soil properties and also peak or failure condition properties for design at the loads a structure is expected to experience the loads, a structure experiences from beginning of construction to completion of construction and during its life time; and this can be achieved by performing load tests on short model pile as introduced in this invention at selected depths in each layer of a soil deposit in which the foundation of a structure is to be embedded. Then, we shall have direct values of side friction versus relative settlement between pile and soil and base resistance versus base settlement both in elastic conditions and failure or peak stresses conditions at various depths of the soil deposit and thereby to construct the load settlement behavior of a full-length of the pile or of any type of deep foundation. In geotechnical field, most accurate values are considered those which are determined from the back-calculation. The above-mentioned load-settlement curves available at various depths shall be very useful in back calculating the reasonably accurate soil properties using the existing theoretical formulae.

BRIEF DESCRIPTION OF THE SEVERAL VIEWS OF THE DRAWING

FIG. 3A: A typical detail of a short model hollow pre-cast reinforced concrete pile (120) and its connection pipe (124).

FIG. 3B: A typical detail of a short model solid pre-cast reinforced concrete pile (126) and its connection pipe (124).

FIG. 4A: A typical detail of an instrumented short model solid pre-cast reinforced concrete pile (127) and its connection pipe (124).

FIG. 4B: A typical detail of an instrumented short model pipe pile (110) and its connection pipe or pipes (111).

FIG. 6A: A typical detail of a cast-in-place pile with bottom plate.

FIG. 6B: A typical detail of a cast-in-place reinforced concrete pile with without bottom plate.

FIG. 7A: A typical detail of hung balance with its load setup using a crane or drill rig boom for performing load test on a short model pile in soft to very soft soils.

FIG. 7B: A typical detail of hung balance with its load setup using a platform with anchors for performing load test on a short model pile in soft to very soft soils.

DETAILED DESCRIPTION OF INVENTION

Figure 1A:
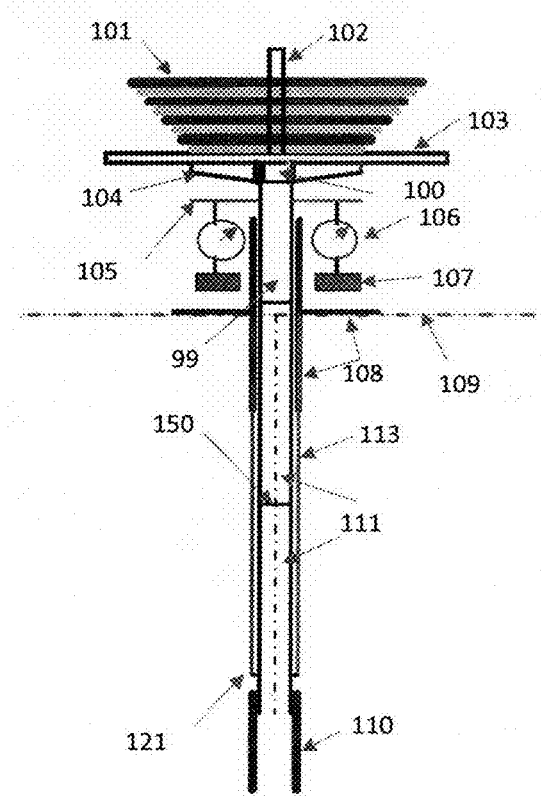
FIG. 1A: A typical detail of direct loading system on a short model pipe pile (110).
Figure 1B:
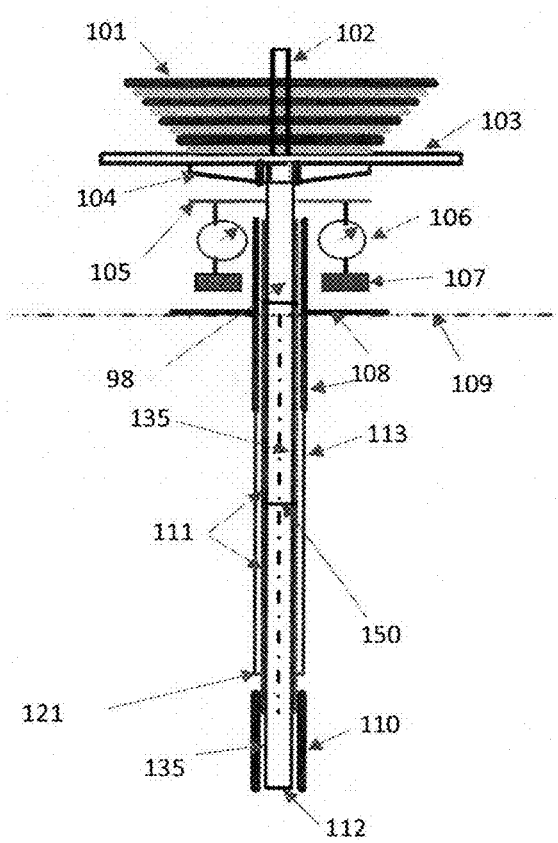
FIG. 1B: A typical detail of direct loading system on a short model pile with end plate (112).

The invention of this application uses subsurface exploration or investigation, using load tests on a short model pile at various depths of a soil deposit to determine load-settlement behavior and engineering properties of soils and intermediate geotechnical materials. The load tests on the short model piles, where applicable and appropriate, may be done using methods as specified and detailed with figures in the ASTM Designation D 1143/D 1143M-07e1 using (a) hydraulic jack acting against anchored reaction frame, (b) hydraulic jack acting against weighted box and (c) direct loading on a single pile using weighted platform. These tests on the short model piles may also be done using procedures detailed in the ASTM Designation D 1143/D 1143M-07e1 for (a) Quick Load Test, (b) Maintained Test (optional), (c) Loading in Excess of Maintained Test (optional), (d) Constant time Interval Loading Test, (e) Constant Rate of Penetration Test, (f) Constant Movement Increment Test, and (g) Cyclic Loading Test (optional). Each country/nation generally publish their own standards for performing load tests on piles; these may be used as appropriate for the load tests on the short model piles in areas of their jurisdiction. Platform or Weighted Box for Loading on Short Model Pile in the direct loading method, two types of load setups can be or shall be used (a) wherein first method comprises placing a bearing plate on the top pipe which connects to series of pipes as necessary to connect to the short model pile, then test beams are placed over it, cross beams placed on the test beams, the cross beams on each end supported by cribbing and wedges; wherein the platform is placed on the cross beams; wherein known weights are placed on the platform, centering and balancing the platform and known weights on the short model pile. The first method has been explained with description and figure for direct loading as described in ASTM Designation D 1143/D 1143M. The second method for direct loading on the short model pile is shown as a typical example in FIG. 1A and FIG. 1B. In this typical example, known weights (101) are stacked in increments on the short model pile as shown in FIG. 1A and FIG. 1B. As shown in this figure, a bearing plate (103), is reinforced by welding a plurality of gusset plates (104) to the bearing plate (103), radially from the center of top pipe (99). The sufficient thickness of bearing plate and number, thickness and depth of the gusset plates is designed in order to limit the deflection/bending of the bearing plate in cantilever action to a reasonable minimum value. In this case the bearing plate reinforced with gusset plates works like a loading platform. For smaller final test loads, the sufficiently thick plate without being reinforced by gusset plates can also be used, if the deflection of the bearing plate in bending is reasonably small or in reasonable limits. As an option, the gusset plate can be welded to the bearing plate, but gusset plates remain in contact with the top pipe or casing (99). In both such cases, as an option, small pipe (100) welded to the bearing plate (103) and protruding into the top pipe or casing (99) to center the bearing plate over the short model pipe can be omitted as centering is accomplished by gusset plates. A pipe (102) helps in centering the known weights. The dial gages (106) are supported on reference beams (107). The reference beams (107) one on each side as shown in FIG. 1A and FIG. 1B shall be oriented in a direction that permits placing their supports at maximum distance as practicable from the center of short model pile (or anchor piles and cribbing when used for other methods of loading platform). The dial gages measure settlement of the pipe or casing (99) as the dial gages are supported between a plate or an angle (105) weld connected to the top pipe or casing (99) and reference beams. The top pipe is thread connected to another pipe (111) (this pipe may also be thread connected another pipe (111), if necessary, to extend the short model pile (110) to the test depth. The short model pile (110) is either thread connected or weld connected to the pipe pile (111). The short model pile (110) has diameter greater than the diameter of the pipe (111). The diameter of the drilled hole should be greater than the diameter of the pipes (99 and 111), to eliminate possibility of any side friction developing between sides of the drilled hole (113) and the pipes (99 and 111). Depending on the type of soils and their density and the presence and depth of the ground water table, the drilled hole may be stabilized by bentonite or mineral or chemical slurry or otherwise may be held by the casing pipes (not shown in FIG. 1A and FIG. 1B). Optionally, if needed, a sufficient thick guide pipe (108) extending some distance into the ground is slipped around the top pipe or casing (99) to prevent its buckling and to keep its vertical position. Optionally, this guide pipe is also attached to a plate (108) which is resting on the ground surface (109) to further prevent the tilting of the top pipe (99). The top pipe (99) is connected to pipe (111) by a threaded joint (150).

The short model pile is inserted or driven by a hammer some distance below the bottom of the drilled hole (121) to minimize the effect of soil removed from the drilled hole. The magnitude of this distance shall depend on the diameter of the short model pile and the type of the soil. After completion of the load test on short model pipe consisting a pipe with no end plate, the loaded platform is removed. After which, the top pipe (98) and pipe (135) with end plate (114) of diameter slightly less than the inner diameter of the pipes (98 and 135) is inserted up to the bottom of the short model pile (110). The platform is again installed as before and the load test on the pipe (98 and 135) with end plate (114) is performed to determine load versus base settlement curve. The top pipe (98) is connected to pipe (135) by a threaded joint (150).

The Load increments by known weights are provided and at each increment, the settlement by dial gages is recorded. Generally, the final test load is 200% of the design load unless failure or peak load is achieved first. The known weights shown in FIG. 1A and FIG. 1B, are shown as increasing in their size, however the known weights can be of any shape or size (and not necessarily of the increasing size) with the condition, the known weights should have their center of gravity on the center of the short model pile. After completion of the load test at the test depth, and when the short model pile is to be advanced to the next test depth for the next test, the loaded platform has to be removed and reassembled to perform another load test on the short model pile at the next selected test depth. Beside other structural design considerations, the most important point in the arrangement for the direct load test is that the center of gravity of the loaded platform has to coincide with the center of the short model pile and the drill rods or casings attached to the short model pile. The settlement at the top of the short model pile equals measured settlement by the dial gages minus elastic compression of the structural units such as (99) and (111); and the settlement of bottom of the short model pile equals calculated settlement at the top of the short model pile minus the elastic compression of the short model pile. The relative settlement between the short model pile and soil is the settlement at the bottom or base of the short model pile minus the elastic compression of the short model pile (Gupta, 2013). When the incremental load method is used with CPT, the load setup in the CPT or CPTu truck or CPT rig, shall be similar to the second method for direct loading as mentioned above, using the cone penetrometer or piezo-cone penetrometer or other types of piles as the short model pile.

As shown in Table 1 and Table 2, for 10 and 15 sq. cm cone tip, the final test load as 2 times the design load is 3.3 kN (about 742 lbs.), when the design side friction and base resistance are 50 and 100 $kN/m^2$ (1.044 and 2.088 Ksf). A friction reducer is provided just above the cone penetrometer. Some friction along the length of the cone rods above the friction reducer even then develops due to the caving of the larger hole. Therefore, estimated value of the frictional load along cone rods above the level of the friction reducer is to be added to the above test loads. The direct loading system as shown in FIGS. 1A and 1B can be mounted on the cone rods inside the CPT truck to perform the incremental load test on the short model pile. For the above design resistances and for the 10 cm diameter pipe pile, the final test loads are 23.56 and 37.7 $kN/m^2$ (5296 and 8475 lbs.), respectively, and for the 15 cm diameter pipe pile, the final test loads are 45.94 and 77.76 $kN/m^2$ (10327 and 17480 lbs.), respectively. Therefore, the selection of type of the loading system is to be based on the final test load to be applied on the short model pile.

The Test Load on the short model pile can also be applied by hydraulic jack(s). In this method, the load is applied on the short model pile with the hydraulic jack(s) reacting against the test beams centered over the short model pile or against the weighted box or platform or the weighted box, which is supported on its sides by timber cribbing. The typical examples of this system are shown and described in ASTM designation D: 1143/1143M-07e1 and in several other publications. Other important system consists of the hydraulic jack acting against an anchored reaction frame, the details of which are also available in ASTM designation D: 1143/1143M-07e1 and in several other publications. Hydraulic jack acting against anchored reaction frame method be found very useful, as it shall be quite convenient to disassemble after one test is complete and assemble back again to perform the next test. A mobile weighted box or platform can also be used, which is movable on plurality number of legs and each leg supported on inflatable tires or un-inflatable tires. The mobile platform or box can also be mounted on tracked vehicle also, which can also be used in rough terrain. The weights can be placed on the weighted box and centered on test beams which in turn centered over the hydraulic jack resting on the short model pile with a bearing plate in between as shown in figures of ASTM Designation: D1143/1143M-07e1 and also in other several publications. The advantage of mobile system is that it shall be very convenient to demobilize the box or platform when one load test on a short model pile is completed at a test depth and the short model pile is advanced to the next test depth. The mobile box or platform can also be housed like in a mobile CPT truck. A CPT truck can also be used when performing load test on model piles. For each site of a project, the appropriate loading platform shall be designed based on the size and length of the pile, subsurface soil conditions, accessibility of the site, rough terrain or otherwise, availability of the materials, beams etc. available at the site or mobilization of the material to the site etc.

Shape and Size of the Short Model Pile

Size of the short model pile will depend upon the diameter of hole drilled in the ground. Greater is the size or diameter of the short model pile greater will need to be the diameter of the drilled hole so that the short model pile could easily be lowered in the drilled hole. The holes can be drilled using augers and drill rods commonly used during SPT. When, holes are larger, augers and casings are used in place of drill rods. The holes could be cased or uncased or stabilized by bentonite or mineral slurry or chemical slurry depending on the subsurface soil conditions. The sectional shape of the short model pile can also depend on the sectional shape of the piles or micro-piles or monotubes or drilled shafts or other types of piles and deep foundation to be used under a structure for deep foundations, for example HP-pile, monotubes, a round or rectangular pipe pile, angular or channel shapes or other types of shapes used for beams and columns, or any other shape or drilled shafts or micro-piles, etc. used in the industry for deep foundations. The shape of the short model pile consisting of concrete can be rectangular, round solid or round or rectangular hollow pile or any other shape used in the industry for deep foundations. It is known that load versus settlement curves depend on the size, type of material, its modulus of elasticity and properties of soil in which the pile is embedded. On a project, the sizes of piles or drilled shaft and their type of materials could be different from one structural unit to the other structural units, for example some units may be supported on concrete piles or drilled shafts and other units may be supported on metal piles. Although not necessary, in such cases, the short model piles may be selected based on the type of deep foundation each unit is supported. When the size of a pile is large or very large in term of its diameter or width, two or three sizes of the same type of pile but shorter in diameter or width than the actual size can be selected, for example, actual diameter is 1.2 meters, but load tests on short model pile of diameter 0.15 m, 0.3 m and 0.6 m can be performed at various depths, and then the side friction determined from the load tests for these two (more or less in numbers than mentioned above) diameters can be used by extrapolation to determine the anticipated peak side friction and peak base resistance for 1.2 m diameter pile or even larger piles. Although some researchers or theories state that the side friction is not dependent on size of piles and also according to theoretical formulae, the base resistance is not dependent on the size or type of pile. However, side friction versus load settlement curves will be different, because the value EA will be greater for larger cross-section and smaller for smaller cross-section (where E is the modulus of elasticity and A is the area of cross-section of a pile or drilled shaft). The side resistance also depends on the type of material of the pile (for example metal or concrete) or whether the concrete pile is precast or cast-in-place. For selecting the short model piles, the type of material of the piles (broadly speaking, type deep foundation) and size or sizes at a project may also be considered.

For determining side resistance versus settlement, a hollow concrete pile or a pipe pile may be required for short model pile. For determining base resistance versus settlement, a short model pile with solid base or closed base shall be required. A solid pile or pile with a base cap can be inserted in a hollow pile and when load is applied on it, it will protrude out of hollow pile and provide base resistance versus base settlement. Alternatively, a short model pile can be selected and strain gages both near the top and base of the model pile can be provided to separate side friction versus relative settlement between pile and soil and base resistance versus base settlement. For pipe piles an end plate can be welded to pipe pile to perform base resistance versus settlement test. Instead of inserting short model solid pile Through the hollow concrete pile, short model solid pile can be load tested below the depth where hollow short model pile was load tested. Any length of the short model pile can be selected. Although not necessary, the length of the pile may also be based on the diameter of the deep foundations, greater is the length of the model pile and greater is size of pile, greater will be weight on the box or platform required to develop failure or peak load in side friction and base resistance. In Table 1, the estimated load required to achieve peak side friction or base resistance or required peak side friction plus peak base resistance has been shown for various size/diameter of the length of the pile. The final test load is generally calculated as two times the design load, unless failure occurs first.

Figure 2A:
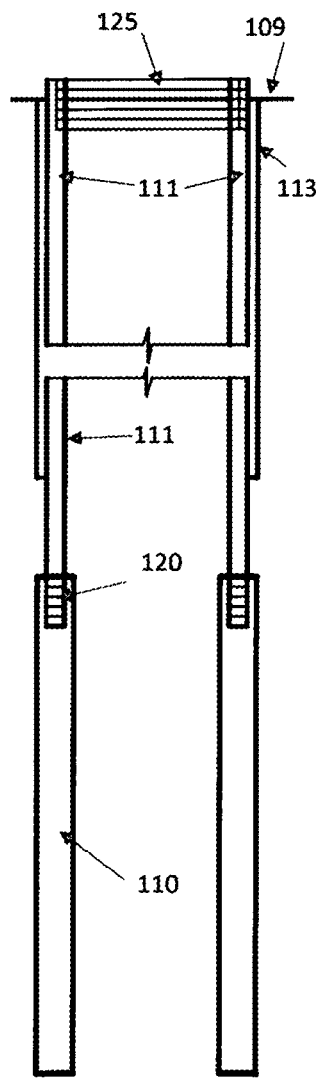
FIG. 2A: A typical detail of a short model pile (110) and its connection pipe or pipes (111).
Figure 2B:
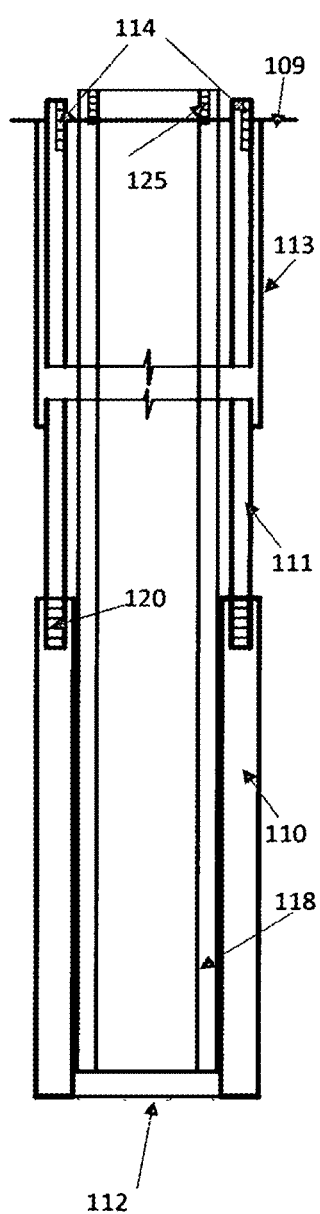
FIG. 2B: A typical detail of a short model pile (118) with end plate (112) and its connection pipe or pipes (111).
Figure 2C:
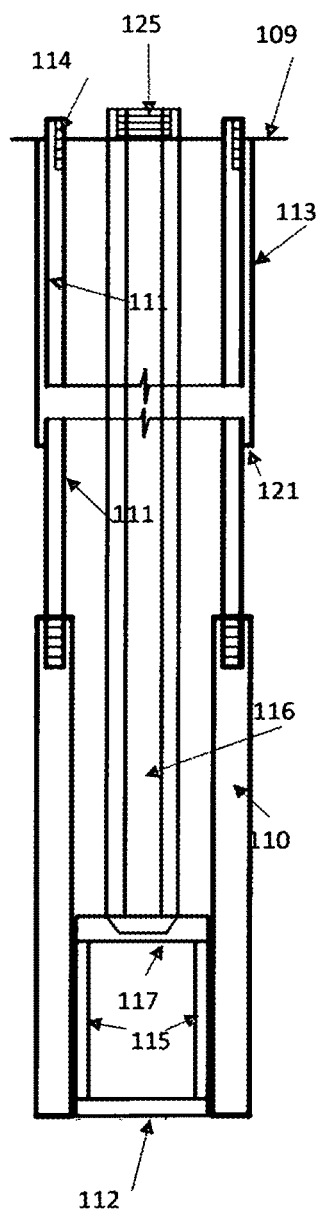
FIG. 2C: A typical detail of a short model pile (116) with end plate (112) and its connection to cone rods.

After selection of short model has been made, the next important decision is the type of pile or structural element which will be connected to the short model pile and extended to the direct loading system or hydraulic jack-loading platform system or hydraulic jack acting against anchored loading system. Any type of structural element (beam or column section) can be selected. For example, in FIG. 2A, the short model pile is a pipe pile (110) with no end plate on it, and it is connected to another pipe section (111) by a threaded joint (120), alternatively it can be a welded joint. (Note: Any other beam or column section can be also selected in place of the pipe section). The pipe section in this case extends to above the ground surface (109), where it is connected to another short pipe section by the threaded joint (125) to extend to the loading platform or to the hydraulic jack placed in between the loading platform and bearing plate (not shown in this figure). This figure also shows the vertical side (113) of the drilled hole. The load test on the short model pile consisting of a pipe section with no end plate shall provide the side friction versus the relative settlement between the short model pile and the soil. FIG. 2B shows the short model pile consisting of the pipe section (118) with an end plate (112) attached to it, inserted in the short model pile (110) up to the tip of the short model pile (110), to perform the load test to determine the base resistance versus base settlement curve. As shown in FIG. 2C, the tip consists of the end plate (112) weld or threads connected to the side plates (115). A top plate (117) on this tip structural unit is connected to the cone rod (116) by the threaded joint. The cone rod/cone rods are extended to above the ground surface and in to the cone vehicle to perform the load test to determine the base resistance versus base settlement curve.

FIG. 3A shows a hollow precast concrete short model pile; the reinforced concrete wall (120) of the hollow concrete pile is made of concrete and reinforced with reinforcing bars (121). The bars extend out the pile where these are bolt (123) connected to the plate (123). A pipe section (124) is weld connected or thread connected to the bearing plate. This pipe with other pipes as necessary to reach the ground surface are installed to extend to the loaded platform either direct loading system or hydraulic jacks acting against loading platform or box or anchored loading system. The hollow reinforced concrete short model pile (120) is load tested to provide the side resistance versus relative settlement curves. FIG. 3B shows a precast solid reinforced concrete short model pile (126) of the diameter slightly less than the inner diameter of the reinforced concrete hollow short model pile (120). The short model solid pile (126) is inserted in the hollow reinforced concrete short model pile (120) up to its tip and then load tested to determine the base resistance versus base settlement curve. Although, it has been stated above that the solid short model pile be inserted in the hollow short model pile (like a pipe), alternatively the load test on the solid short model pile can be performed below the depth where hollow short model pile (like a pipe) test was performed and using data of both the load test data of hollow concrete pile and solid concrete pile, the side resistance versus relative settlement between soil and pile and based resistance versus settlement curves can be determined.

FIG. 4A shows a precast reinforced concrete (either prestressed or without any prestress) solid short model pile (127) instrumented by two strain gages (128) each on the diametrically opposite reinforcement bars (121) and the cables (129) connecting the strain bars. The cables (129) installed by the side of the reinforcing bars and then extend out the concrete and then installed by the side of the pipe (124) which extend to above the ground surface. The reinforcing bars pop out of concrete and are then held by a plate (123) and bolts (122). A pipe (124) is weld or thread connected to the plate (123). The top of this pipe is provided with female or mail threads (125) to connect to series of pipes as needed to reach above the ground surface. Alternative to this arrangement, any beam or column section can be used in place of the pipe, the series of the beam or column sections as needed shall be connected to each other by an overlapping plate which is bolted or welded to the beam or column sections. FIG. 4B shows the short model pipe pile (110) with end plate (112) similarly instrumented by strain gages (128). The angle or channel sections (130) protect the strain gage from any damage during lowering down the drilled hole or when driven by a pile driving hammer and also during the load tests. Another pipe (111) or series of pipes as needed extends to the ground surface as shown in this figure. Although, the typical example shown in FIG. 4B is for pipe piles, but when using any beam or column sections (including but not limited to HP piles) for the short model pile or providing its extensions to ground surface, the instrumentation details can be similar, separate details have not been shown in this description. In these examples, the instrumentation consists of strain gages, but as an option, any other type of instrumentation (including but not limited to only LVDT or tell tales) available in the industry shall be also considered with installation details as appropriate to the specification of the manufacturers. In instrumented piles, the instrumentation helps in separating the side resistance and base resistance from the total test load at each load increment.

Figure 5:
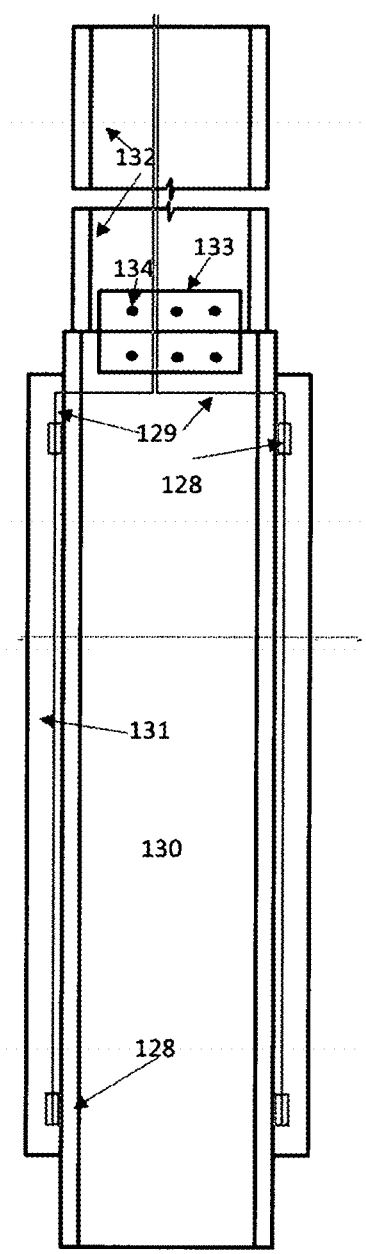
FIG. 5: A typical detail of an instrumented short model pile of a beam or column section and its connection beam or column section (132).

FIG. 5 shows a typical detail of a short model pile consisting of a beam or column section (130), such as for example a HP or channel section etc., connected to another beam or column section (132) by a plate (133) and bolts or rivets (134) or by welds. The section (132) extends to the top above the ground, and on top of it the direct loading or loaded platform or box or anchored system is placed to perform the load test on the short model pile. This pile is also instrumented by strain gages and protected by angles or channel section as shown in FIG. 5.

Cast-in-Place Piles:

The cast-in-place piles includes the concrete cast-in-piles, micro-piles and drilled shafts. FIG. 6A shows a detail of a cast-in-place short model pile using top and bottom plates (160), longitudinal (163) and lateral (transverse) reinforcement (171), and a grout pipe (165) for high strength cement grouting and beam or column or pipe section (166) weld connected to the top plate (160). The longitudinal reinforcement is bolt connected (167) or weld connected to the top plate and welded or thread connected to the bottom plate (160). The bottom plate has a hole (162) to allow cement grout to flow under the plate to provide a firm base. The grout is also connected to diametrically opposite two pipes to permit flow of cement grout radially from bottom to gradually flow to the underside of the top plate. The cement grout can be either flow under gravity or using low pressure not to lift the short model pile assembly, unless a bleed valve is provided in the top plate. Threaded joint connections are used to extend beam or column or pipe section to the top above the ground. The high strength cement grout should have low cement-water ratio and fluidity increased by the plasticizers and additives. The high strength grout should have the same strength as that of the production cast-in-place piles. The bearing plate is placed on top of the beam or column or pipe section (which ever selected) and there upon the bearing plate supports the hydraulic jack underside the weighted platform or box or the anchored system. The FIG. 7B shows the same detail as in FIG. 7A, except that it does not have end plate (160). The ground surface (109) and sides of the drilled hole is also shown in FIG. 7A and FIG. 7B. As an option, cast-in-piles shall also be instrumented to assist in collecting more data for the analyzing and computing the load-settlement relationships.

Although, in this application, many examples of short model piles and its connection structural units have been detailed for mainly to describe how it can be done, but it is not possible to detail out all possible combinations in this application. The selection of type of the short model pile and its connection by structural units extending to above the ground surface and its design shall be made and finalized for each project site, separately. All types of piles, drilled shafts, micro-piles, etc. used as the short model pile shall be either instrumented or shall be without any instrumentation as needed to determine accurately the load-settlement relationships of the deep foundations of a project. The measurement of settlement shall be taken using dial gages, or digital gages, or as an option, by strain gages or LVDT or any other form of electronic measurements (available in the industry), and also as an option by directly transferring the data to a computer or by remote control to distant computer. When the load is applied by the hydraulic jack, the measurement of the load shall be done by use of either dial gage, or digital gage or load cell or as an option by any other form of electronic measurements (available in the industry) and also as an option, directly transferring the data to a computer or by remote control to distant computer. As an option, the electronic load cell or pressure cells or any other form of electronic measurements for measuring load distribution in the short model pile from its top to bottom or base shall also be considered and installed.

(i) Subsurface Exploration Using Load Tests Using Incremental Loading on Short Model Piles for Soils and Intermediate Geomaterials Other than Soft to Very Soft Soils Load tests using incremental loading during subsurface exploration, or during or after construction can or shall be performed in Soils and Intermediate Geomaterials other than Soft to Very Soft Soils. These load tests on short model piles can also be performed in conjunction with SPT or CPTu or CPT or PMT or DMT. SPT blow count tests during SPT soundings are conducted up to the desired depths, generally at about 5 ft (1.5 m) depth intervals, incrementally adding drill rods on the drill rods already installed. The subsurface profile consisting various layers is developed depicting blow counts, thickness and elevation of each layer, and type of soil in each layer. In conjunction with SPT, the subsurface exploration or investigation shall consist of one or two (or more) load tests on short model pile in selected load increments in each layer until failure or peak load is achieved. Number of load tests to be performed on short model pile and their depths shall depend on thickness of that layer. For thick layers, the number of load tests on short model pile could be about two or more, one each near (about couple of feet from) top and bottom of the layer and if more than two then spaced between these two tests. The load tests both to determine side friction versus relative displacement between pile and soil and to determine base resistance versus base settlement shall be performed as considered necessary based on design and economics.

If the diameter or width of the short model pile is greater than that of the drill rods available in the industry, then casing method to drill holes (similar to methods used for excavations for drilled shafts) can be used and the model pile attached to the casing. Both the casing and model pile must be less than diameter of the drilled hole. Casing diameter also must be less than that of the model pile. Any of the weighted box or platform methods or hydraulic jack acting against anchored reaction frame method, mobile vehicle method as explained above can be used for applying load increments as per the design. In certain cases, the diameter of the short model pile may be less than the diameter of the drill rod. For instrumented piles, both methods of placing them in the drilled hole or driven by a pile driving hammer from the bottom of the drilled hole or driven from the ground surface may be used.

Using CPT rig or CPT truck, incremental load tests on short model piles can also be performed making some attachments inside on the CPT truck by using arrangement such as shown in FIG. 1A and FIG. 4B. CPTu or CPT probe can be considered as a short model pile and incremental load performed to provide local side friction versus relative settlement between local friction sleeve and the soil and cone tip load versus cone tip settlement. CPT or CPTu probes can also be replaced by short model piles as shown in above figures and attached CPT push rods and tests performed. Dilatometer blade can also be used as a short model pile and incremental load tests performed. Pressuremeter tests can also be done in conjunction with SPT and load tests on short model piles.

(ii) Subsurface Exploration with Load Tests Using Incremental Loading on Short Model Piles for Soft to Very Soft Soils Load tests on short model pile using incremental loading during subsurface exploration, or during or after construction can or shall be performed in soft to very soft soils. The load tests on short model piles can also be performed in conjunction with SPT or CPTu or CPT. In soft to very soft soils, drill rods continue to sink and generally are held by pipe wrenches or winches and therefore, and in many cases it is not possible to obtain any information about SPT blow counts (N-values). The soft to very soft soils during SPT soundings are therefore represented by weight of rods (WOR) or weight of hammer (VVOH), and cannot be load tested unless a special set up is installed. First hole is drilled to desired depth and generally holes are cased to keep the hole open unless it can be stabilized by bentonite or mineral or chemical slurry or unless the hole stays remain open without caving. As shown in FIG. 7A, first a spring balance consisting of dial gage or digital gage is hung on the drill rig boom using a hook (143). Note: Some auger rigs have a threaded joint and then casings are held and attached using the threaded joint, in that case the hook (143) will be attached to a short piece of casing, which has a threaded joint for attaching to the auger ring or attached to the hung balance if it has a the threaded joint at its top. The drill rod or casings (135) with split spoon sampler or the drill rod/casing with a hollow short model pile with no plate at the end or a solid pile or drill rod or casing with an end plate is lowered to the test depth and held by pipe wrenches at the ground surface, if so necessary (Note: The split spoon sampler or short model pile has not been shown in this figure, but it is located at the end of the bottom most drill rod or casing). The top pipe or casing (136) is then attached to the top drill rod or casing (135), still holding the assembly by the pipe wrenches at the ground surface, if so necessary. The top drill rod or casing (136) consists of the bearing plate and gusset plates in radial direction from the center of drill rods or casings. The drill rod or casing (136) is then attached to the digital or dial gage hung balance (137) with attachments (138, 139, 140 and 141). The hung balance is then attached to the crane boom or drill rigs boom using hook ((143). Till it is not hung on the crane or drill rig boom, the whole assembly should be held by the pipe wrenches if so considered necessary. Because whole assembly is hung and held, the digital or dial gage hung balance measures the load of the assembly consisting of drill rods/casings and hung spring balance (137), but there is no load on the soil even though it is touching the soil at the bottom of the hole. The known weights in two halves are placed around the top drill rod (136) on the bearing plate in increments and at each known increment, the reading of the settlement of the short model pile penetrating in to the soil is taken by the dial gages (106). The dial gages or digital gages are supported on reference beams and are also in touch the plate or angle (104), which is attached to drill rod or casing (136). The digital or dial gage hung balance (137) measures the load at each increment, the measured load is a sum of the weight of the whole assembly plus known weight in a particular load increment; deducting the weight of the whole assembly from the sum, provides the load by which the short model pile is penetrating in to the soil; thus providing the load versus the settlement of the short model pile in to the soil. This process of loading in increment is continued until the peak load is achieved. Generally, in very soft to soft soil, the tip or base bearing is quite small and generally neglected, and therefore, the readings of load increments can be considered to represent approximately equal to the side frictional resistance around the short model pile. The measured settlement is the sum of the elastic compression of the short model pile plus relative settlement between the short model pile and soil and tip settlement. Another load test on the solid short model pile or the short model pipe plie with the end plate can also be performed at about the depth below where the load test on hollow short model pile in the same hole or otherwise in a separate hole but at same depth, to isolate base resistance and side resistance and base settlement and relative displacement between the short model pile and soil. After completion of a test, the whole assembly and drill rods with short model pile and the test setup are then carefully pulled out of the ground. The Drill rods with short model pile are then extended to the next test depth in the same manner as before to perform another test. Proper record of all measurements of the loads and settlement is maintained and load-settlement curves at each test depth are drawn to make analyses for determining side friction versus settlement curves (and also base resistance and base settlement curves). Instrumented piles with solid base or end plates can be used to measure both side friction and base resistance. From the side friction versus settlement curves and end bearing (base resistance) versus base settlement curves, necessary soil properties can be back calculated. Using these curves obtained at various depths, the load settlement behavior of a full-length production pile can or shall be determined. Even soft to very soft soils extending to such great depths provide significant lateral stability to the pile and pile capacity by providing significant side friction and end bearing and therefore, should be accounted for in design and not ignored. These tests shall also be very useful for design of offshore structure and wind towers in deep offshore waters.

Drill rigs or Auger rigs can also be used for subsurface exploration elsewhere in the vicinity while the load test on short model pile is being performed. For that eventuality, a typical example of a setup as shown in FIG. 7B can be or shall be used. In this setup, a frame comprising of a plate (150) placed on the ground surface, a plurality of anchor piles anchored at the outside edge of the plate using bolt (149), a beam or column section (147) and gusset wedges weld connect to the plate (150), a top beam section (145) and gusset plates (146) weld connected to the beam (147) is provided. Gusset plates (146) are also weld connected to the beam section (145). The whole test assembly as also shown in FIG. 8B is hung to the bracket held by gusset plates and anchors using a hook (143) and bolt (144) from the beam or column section (145). The holes (148) are provided to fasten to any truck or vehicle etc., if so considered necessary. The load test on the short model pile is performed in the same as explained above, while describing details in FIG. 8A. The design of hung balance assembly may also need to be designed for each site considering the condition of the site (rough terrain etc.), availability of materials, the drill rig or crane type and feasibility of placing anchors.

As an option, the settlement readings can also be measured by using strain gages or LVDT or other methods of electronic measurement. The short model pile may consist of a pipe pile or pipe pile with end plate or piles made of column or beam sections (includes but not limited to HP-pile), or hollow reinforced concrete (prestressed or without any prestress) pre-cast piles or solid pre-cast (prestressed or without any prestress) reinforced concrete piles, or monotubes or any other types of piles which can be used in the very soft to soft soils in the industry as a deep foundation. The above-mentioned types of piles are either provided with instrumentation or are not provided with instrumentation. To extend the short model pile to the selected test depth, the pipe or beam or column sections shall be used for connecting to the short model pile. The threaded joint or welded joint shall be used to connect the short model pile consisting of the short model pile to the pipe section or the pipe section to another pipe section, as needed. The short model pile consisting of beam or column section (including but not limited to HP section) is connected to the beam or column section with a welded joint or by an overlapping plate fastened to both the short model pile and beam or column section by bolts or rivets or weld.

When subsurface exploration is being conducted using CPT or CPTu at constant standard rate of 2 cm per second using the CPT rig, the cone penetrometer or piezocone penetrometer can also be used or shall also be used as the short model pile. The hung balance will be hung inside the CPT rig or truck by making a special attachment. Incremental loading method to apply loads on the short model pile consisting of cone or piezocone penetrometer shall be used. The second method of direct loading method shall be used for applying the load increments on the cone rods. The platform consisting of the bearing similar to the one explained above as shown in FIG. 7A shall be installed on the top cone rod, with dial or digital gages or as an option by using strain gages or LVDT or other methods of electronic measurements.

The instrumentation embedded in or attached to the short model piles comprises the strain gages, but as an option, any other type of instrumentation (including but not limited to only LVDT or tell tales) available in the industry shall also be considered with installation details as appropriate to the specification of the manufacturers. To determine the side friction versus relative settlement between the short model pile and the soil or intermediate geomaterials curve, a hollow short model pile which has small wall thickness with small annular compared to the outside area like the pipe pile or the HP-pile etc. shall be used and to determine the base resistance versus base settlement, a solid pile like a pile with end plate or solid reinforced concrete pile etc., shall be used. when the short model pile is instrumented whether it is the hollow short model pile or the solid short model pile, the instrumentation assists in determining or separating the applied incremental load and settlement measured at near the top of the top pile in to the side frictional resistance, the base resistance, relative settlement between the soil or intermediate geomaterial, and base settlement, without any need to perform separate load tests for the hollow and solid pile.

(iii) Subsurface Exploration Using Load Test on Short Model Pile Using Axial Loading with the Constant Rate of Displacement Per Minute for Soils and Intermediate Geomaterials Other than Soft to Very Soft Soils Load tests using the constant rate of displacement per minute during subsurface exploration, or during or after construction can or shall be performed in Soils and Intermediate Geomaterials. These load tests on short model piles can also be performed in conjunction with SPT or CPTu or CPT or PMT or DMT. One type of axial loading device for CPT is screw jack driven by an electric motor through a geared transmission, or a hydraulic loading device such as hydraulic actuator and servo-valves or any other compression device with sufficient capacity and control to provide a constant rate of strain/displacement. In addition, axial load device consists of an electronic load cell. The triaxial compression tests always use the constant rate of displacement; the magnitude of the constant rate of displacement is selected based on the type of soil in the test specimen. The triaxial compression tests are conducted in the laboratory on undisturbed or disturbed or compacted samples of the soil. Since the undisturbed specimen or samples can only be extracted from the ground for only clayey soils and cannot be extracted from sandy soils, the triaxial compression tests are always done on disturbed or remolded specimen of sandy soils compacted in the laboratory. However, the load tests on the short model piles can be performed in in-situ sand or clayey or silty soils in the field using the constant rate of displacement after developing a special device similar one in CPT trick or rig or one in the triaxial compression tests. The invention of the load tests on short model piles using the constant rate of displacement in-situ in the field will provide a new and accurate method for subsurface investigation, for both clayey, silty and sandy soils in undisturbed conditions. The possibility of some disturbance even in undisturbed specimen happens due to the change or loss of both horizontal and vertical stresses in the undisturbed specimen when it is extracted out of the ground and then some amount of disturbance in shaping the undisturbed specimen by cutting and then placing in triaxial test apparatus. In triaxial compression test, the sample experiences load while the specimen experiences the constant rate of settlement from bottom of the specimen to upwards, while in CPT truck, load on cone penetrometer is applied from the top in downwards direction to push the cone penetrometer in downward direction. The CPT truck or vehicles are setup with software and associated devices to advance the cone penetrometer tip with a conical point having 60°-degree apex angle and cone base area of 10 or 15 cm² through the soil at a constant rate of 2 cm per second. The force on the conical point (cone) required to penetrate the soil is measured by electrical methods, at a minimum of every 1 or 2 or 5 cm of the penetration. Stress is calculated by dividing the measured force (total cone force) by the cone base area to obtain cone resistance, qc. The friction sleeve is present on the penetrometer immediately behind the cone tip, and the force exerted by electrical methods at a minimum of 5 cm of penetration. Stress is calculated by dividing the measured axial force by the surface area of the friction sleeve to determine sleeve resistance, $f_s$. Most modern penetrometer (piezocones) are capable of registering pore water pressure induced during advancement of the penetrometer tip using an electronic pressure transducer. piezocones are advanced at a rate of 2 cm per second and readings are taken at every 5 cm of penetrometer. Complete details are provided in Standard Test Method for Electronic Friction Cone and Piezocone Penetration Testing of Soils, Designation: D 5778-12.

With the advance rate of penetration of 1 or 2 or 5 cm per second, the cone produces failure of the soil instantly and so no readings are available in pre-failure and elastic or pseudo elastic ranges of loading, are available. The triaxial compression load tests are performed at the constate rate of penetration of between 0.0001 cm per minute (i.e. 0.00000167 cm per second) and 1 cm per minute (0.0167 cm per second). At the above-mentioned constant rate of settlements, the instant failure of soil does not occur, instead readings of stress versus settlement in the elastic range to the pseudo elastic range to the peak stress conditions shall be possible and shall be taken and analyzed. Therefore, a software and associate devices shall be developed to produce the constant rate of settlement between 0.0001 to 1 cm per minute or from 0.001 to 1 cm per minute. According to the inventor of this application, the constant rate of settlement between 0.001 and 0.0001 cm per minute are needed during the triaxial compression test because the specimen bulges and forms a barrel shape and therefore no-uniform pore water pressures develop throughout the height of the specimen. Therefore, to equalize pore water pressures, a very slow constant rate of penetration between 0.0001 and 0.001 cm per second is required. The research (which is in progress) on the triaxial compression tests on specimen with an expandable jacket (Gupta, 2016) around the specimen may demonstrate that the constant rate of settlement of 0.001 or even 0.01 cm per second may be sufficient for pore water pressures to equalize throughout the height of specimen. It is expected that the constant rate of penetration shall produce no or very little bulging in the in-situ soils, when cone penetrometer or short model pile advances in to in-situ soils in the field and therefore the constant rate of penetration between 0.001 to 1 cm per minute or between 0.01 cm to 1 cm per minute may only be required. The cone penetrometer may work as an ideal short model pile as it shall provide data for both local sleeve friction and cone tip resistance and after analyses of the data, both local side friction versus relative settlement between soil and base resistance versus base settlement curves shall be available. The cone penetrometer rig or truck shall be equipped with software for advancing cone penetrometer both at constant rate of penetrometer at 2 cm per second and also another software at the constant rate of penetration between 0.0001 cm per second and 1 cm per second or between 0.001 cm per second and 1 cm per second to advance the cone penetrometer and short model pile.

Figure 8:
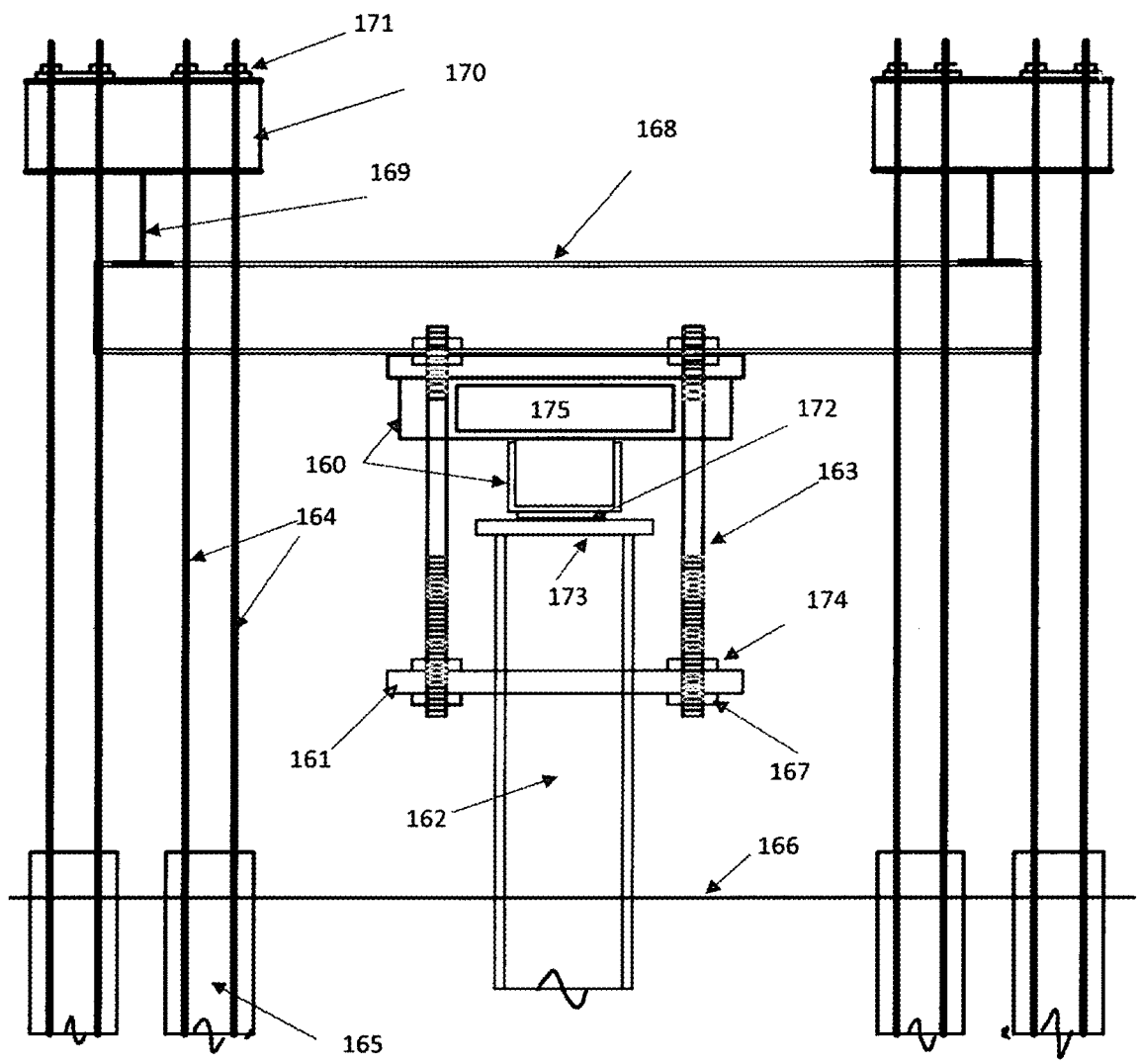
FIG. 8: A typical detail showing a device for constant rate of penetration between 0.0001 cm per minute and 1 cm per minute for load testing on short model pile with schematic set-up for applying load using anchored reaction frame.

Alternatively, the short model pile consisting of a pipe section with no end plate and the short model pile consisting of the pipe section with end plate or other types of piles (with or without instrumentation) and attached to the cone rods can be or shall be used to perform load tests using the CPT truck but using the lower constant rate of penetration as mentioned in the above paragraph. Probably, the diameter of the short model pile greater than 75 mm may not be feasible with the existing weights of the truck. In such a case, software and associate devices may need to be or shall be developed similar to one used in triaxial test apparatus to be used under loaded platforms. In place of the hydraulic jack, the software and associated loading devices shall be placed under the loaded box or platform or against the anchored reaction frame, as shown in FIG. 8. In FIG. 8, a set-up for applying load to the short model pile is shown using a loading device (160), which is capable to push the short model pile at the constant rate of settlement between 0.0001 to 1 cm per minute or between 0.001 to 1 cm per minute or between 0.01 and 1 cm per second. Anchored reaction frame comprises anchors (165), rods (164) to fasten anchors to beam sections (170, 169 and 168) using bolts (171), The loading device takes reaction against the beam (168) in-turn from the beam sections (169, 170) and thereby from anchors (165). The loading device consists of digital panel (175), platen (172) tie rods (163), a plate (161) fastened to tie rods (163) bolts (167 and 174). The loading device (160) pushes the short model pile through the bearing plate (173) and top rod or series of rods (162). In FIG. 8, the short model which is connected at the bottom of the top rod or casing (173) or series of rods (162), as necessary, has not been shown. Similarly, the dial gages and its attachments to reference beam and top rod (173) has not been shown; the detail will be similar to one shown in FIG. 1A or FIG. 1B. FIG. 8 shows details for applied to short model pile using the above mentioned load device against anchored system; similarly the other loading systems like the above-mentioned load device acting against weighted box or platform or acting against direct loading system can also be used, depending on the load requirements. In CPT truck or rig, either two loading systems (one for 2 cm per second penetration and other using 0.001 and 1 cm per minute constant rate of penetration) or one loading system integrated to provide 2 cm per second constant rate of penetration to 0.001 cm or 0.0001 cm per minute constant rate of penetration.

A loading device similar to the one used in CPT truck or rig may also be used to produce the constant rate of penetration between 0.0001 and 1 cm per minute or 0.001 and 1 cm per minute, or 0.01 and 1 cm per minute 0.0001 and 1 cm per minute or 0.001 and 1 cm per minute, or 0.01 and 1 cm per minute shall be used with the same loading setup as in CPT rig; wherein when constant rate of penetration required as 2 cm per second for cone penetrometer soundings, the existing system of the loading device shall be used; wherein when load test on short model pile is being done, then the loading device shall be switched to the one which produces the constant rate of penetration between 0.0001 and 1 cm per minute or 0.001 and 1 cm per minute, or 0.01 and 1 cm per minute; alternatively, the loading device which produces the constant rate of penetration between 2 cm per second and 1 cm per second may be used; wherein when the capacity of load set-up in the CPT truck or rig is exceeded or when the CPT truck or rig is not available then the software and associated loading devices shall be placed under the loaded box or platform or against the anchored reaction frame, which has sufficient load capacity to apply final test load on the short model pile.

(iv) Determination of Soil Properties from Side Friction Versus Settlement Curves and Base Resistance Versus Base Settlement Curves First step is to analyze the side friction versus settlement and base load versus base settlement determined from the load tests on short model piles at various depths of the soil deposit. There are several methods such as Van der Veen (1953), Kezdi (1957), Seed and Reese (1957) and Gupta (2013). Recently, several researchers have also used numerical techniques such as finite element method. An example for illustration of how to perform the analyses, the method described by Gupta (2013) is being used as given below.

Non-linear relationship between the side frictional resistance ($f_s$) and the ratio $\Delta/d$ under the applied vertical load (axial load) on a short model pile can be represented by a hyperbolic model using the following relationship (Gupta, 2012, Gupta, 2013, Gupta, 2015):

$$f_s = \frac{(\Delta/d)}{\frac{1}{G_i} + \frac{\Delta/d}{f_{sasymp}}} =$$ (1)

$$\frac{(\Delta/d)}{\frac{\ln(5L(1-v)/d)}{2G} + \frac{\Delta/d}{f_{sasymp}}} = \frac{(\Delta/d)}{\frac{\ln(5L(1-v)/d)}{2G} + \frac{(\Delta/d)R_f}{f_{su}}}$$

where (i) $f_s$ is the side frictional resistance developed at any instant of time when the relative movement between short model pile and soil or intermediate geomaterials at any depth is $\Delta$, (ii) d is the diameter of the short model pile, (iii) L is the embedded length of the short model pile, (iv) $f_{su}$ is the ultimate side frictional resistance which could be reached before the asymptotic value of side frictional resistance ($f_{s\ asymp}$), (v) $R_f$ is the failure factor and is equal to $f_{su}/f_{s\ asymp}$, (vi) v is the Poisson's ratio, (vi) $G_i$ is the initial tangent shear modulus to the hyperbolic curve, and G=shear modulus. The value of $f_s$ equals vertical load/$\pi$dL at any instant of time.

Figure 9A:
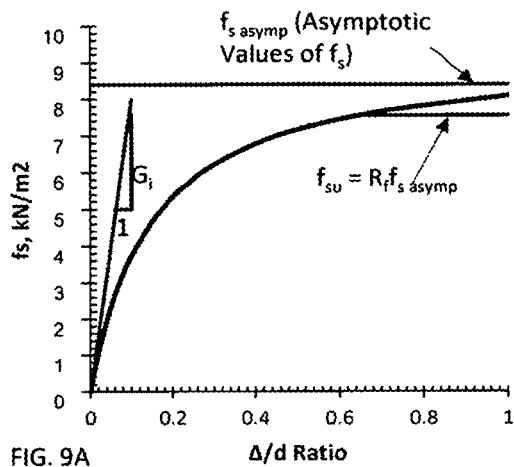
FIG. 9A: A typical detail for $E=kN/m^2$ and $f_{su}=kN/m^2$, hyperbolic model, $\Delta/d$ versus $f_s$.
Figure 9B:
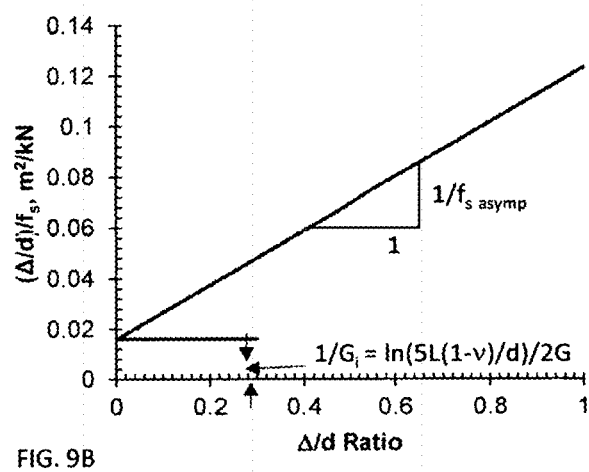
FIG. 9B: Hyperbolic model plotted on transformed axes ($x=\Delta/d$, $y=(\Delta/d)/f_s$).

A typical hyperbolic model for $f_s$ versus $\Delta/d$ is shown in FIG. 9A and a typical hyperbolic model for $(\Delta/d)/f_s$ with transformed axes is shown in FIG. 9B. Using curve fitting method, a linear fit of the data on transformed axes as explained above provides the unique values of $G_i$, G and $f_{su}$ and also provides the coefficient of correlation ($R^2$). In FIG. 9B, it is assumed that if the failure occurs before reaching the asymptotic value, say, when $R_f$=0.9, then side friction $f_s$ with increase in the value of $\Delta/d$ continues to occur at constant value of $f_{su}$ equal to $R_f$ times $f_{s\ asymp}$. When a side friction ($f_s$) versus relative settlement curve ($\Delta$) has been obtained from a load test on a short model pile, it is drawn as shown in FIG. 8A and then $(\Delta/d)/f_s$ versus $\Delta/d$ curve is drawn as shown in FIG. 9B. The Y-intercept of the straight-line curve in FIG. 9B provides the value of G, while the slope provides the value of $f_s$.

Similarly, representing base resistance versus base settlement curve by a hyperbolic model, the following hyperbolic equation can be formulated:

$$q_b = \frac{(\Delta b/d)}{\frac{1}{E_i} + \frac{\Delta b/d}{q_{basymp}}} = \frac{(\Delta/d)}{\frac{1}{E_i} + \frac{(\Delta b/d)R_f}{q_{bu}}}$$ (2)

Where, (i) $Q_b$=Axial Load at any instant of time, when the base settlement is $\Delta$, (ii) $A_b=\pi d^2/4$ for circular section, (iii) $A_b$=width*length for rectangular section, (iv) $q_b$=End Bearing Resistance=Q/$A_b$, (iv) $E_i$=initial tangent modulus, (v) $q_{b\ asymp}$=asymptotic value of $q_b$, (vi) $q_{bu}$=ultimate end bearing resistance that can be reached before asymptotic value, ($q_{b\ asymp}$) and (vii) qb=Qb/A.

Alternatively, using Poulos and Davis (1976) formula for linear elastic settlement, the following hyperbolic model can be formulated:

$$q_b = \frac{(\Delta b/d)}{\frac{\pi(1-v.v)}{8E_i} + \frac{(\Delta b/d)R_f}{q_{basymp}}} = \frac{(\Delta b/d)}{\frac{\pi(1-v.v)}{8E_i} + \frac{(\Delta b/d)R_f}{q_{bu}}}$$ (2B)

Figure 9C:
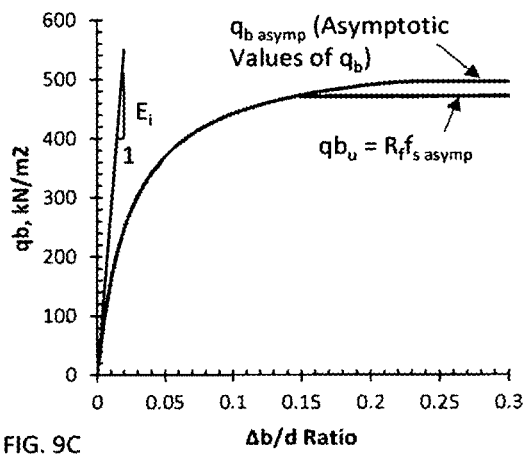
FIG. 9C: A typical detail for $E=kN/m^2$ and $q_{bu}=kN/m^2$, hyperbolic model, $\Delta b/d$ versus $q_b$.
Figure 9D:
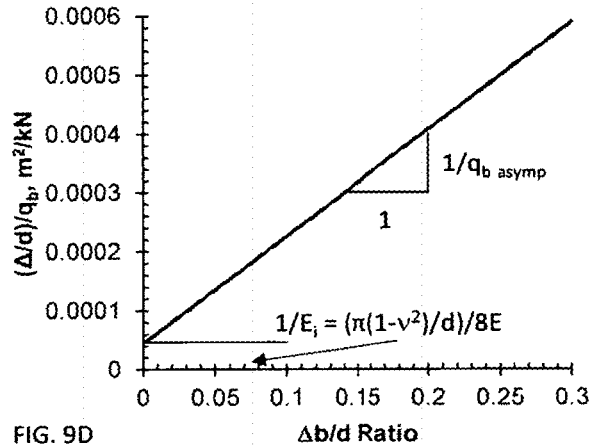
FIG. 9D: Hyperbolic model plotted on transformed axes ($x=\Delta/d$, $y=(\Delta/d)/q_b$).

A typical hyperbolic model for $q_b$ versus $\Delta/d$ is shown in FIG. 9(C) and a typical hyperbolic model for $(\Delta/d)/q_b$ with transformed axes is shown in FIG. 9(D). Using curve fitting method, a linear fit of the data on transformed axes as explained above provides the unique values of $E_i$, E and $q_{bu}$ and also provides the coefficient of correlation ($R^2$). In FIG. 9(D), it is assumed that if the failure occurs before reaching the asymptotic value of $q_b$, say, when $R_f$=0.9, then the base resistance $q_b$ with increase in the value of $\Delta/d$ continues to occur at the constant value of $q_{bu}$ equal to $R_f$ times $q_{b\ asymp}$. When the base resistance ($q_b$) versus relative settlement curve ($\Delta b$) has been obtained from a load test on a short model pile, it is drawn as shown in FIG. 9C and then $(\Delta/d)/q_b$ versus $\Delta/d$ curve is drawn as shown in FIG. 9B. The Y-intercept of the straight-line curve in FIG. 9B provides the value of E, while the slope provides the value of $q_b$.

Shear modulus (G) is related to E by the following equation:

$$G=E/\{2(1+v)\}$$ (3)

At the present, there is a limited amount of data available from instrumented load tests on full length piles and drilled shafts only. When load tests on the short model piles have been conducted on various sites with differing subsurface soil conditions, considerably amount of data shall be available, further research and analyses may show a need to develop new or modified equations. In such a case, new equations can be developed or the above equations can be modified to perform analyses and to determine values of $f_s$, G, $q_b$, and E.

For piles driven in clayey soils, the value of t has been determined generally on the basis of factors such as $\beta$, or $\alpha$, or $\lambda$ (AASHTO, 2012):

$$f_s=\beta\sigma'_v, \text{ or } f_s=\lambda(\sigma'_v+2S_u), \text{ or } f_s=\alpha S_u$$ (4)

where $\sigma'_v$ is the effective vertical stress at the designated depth, and $S_u$ is undrained shear strength.

For drilled shafts embedded in clayey and silty soils, the value of $f_s$ has been determined generally on the basis of factors such as $\beta$, or $\alpha$ (AASHTO, 2012):

$$f_s=\alpha S_u, \text{ in which}$$

$$\alpha=0.55 \text{ for } S_u/p_a \le 1.5 \text{ or } \alpha=0.55-(S_u/pa-1.5) \text{ for } 1.5 \le S_u/p_a \le 2.5$$ (5)

where, $S_u$ is in ksf and $p_a$ represents atmospheric pressure in ksf, NOTE: 1 ksf=47.8803 kPa The piles driven in clay or embedded in clayey, the value of $q_{bu}$ has been determined generally (AASHTO, 2012) as:

$$q_{bu}=9S_u$$ (6)

for piles driven in clayey soils $$q_{bu}=N_c S_u \leq 80 \quad (7)$$

for drilled shafts embedded in clayey soils, where, $$N_c=6[1+0.2(Z/d)] \quad (8)$$

where Z is penetration of shaft in feet below ground surface, NOTE: 1 foot=0.3048 m Form CPT soundings, $S_u$ is determined as (AASHTO, 2012):

$$S_u=(q_c-\sigma'_v)/N_k, \quad (9),$$

where $N_k$ is a factor varying between 10 and 20.

From DMT soundings, $S_u$ is determined as:

$$S_u=0.22\sigma'_v(0.5\ K_D)^{1.25} \quad (10),$$

where $K_D$ is a horizontal stress index (Marchetti, 1980)

Undrained Young's Modulus, E, has been determined from the equation: $E=K\ S_u$, where K is estimated from a chart based on the value of plasticity and overconsolidation ratio (Duncan and Buchignani, 1976). There are numerous correlations for $S_u$, E and G, available in publications.

Value of $S_u$ is generally determined from the laboratory tests on undisturbed samples extracted from the selected depth or otherwise determined using empirical correlations developed for in-situ tests such as SPT, CPTu or CPT or DMT or PMT. Empirical correlations for these in-situ tests are developed by comparing with the laboratory test results. However, with the invention presented in this application, the reasonable accurate value of G, E and $S_u$ can be back-calculated from the value of $f_s$ and $q_{bu}$ determined from the load tests on short model piles at various depths of the soil deposit, and then new values of factors $\beta$, or $\alpha$, or $\lambda$ can be developed to correlate the $f_s$, $S_u$, G and E etc. using the in-situ test data locally for each site. When the correct values of factors $\beta$, or $\alpha$, or $\lambda$ or K have been determined from a site from the load tests on short model piles, then the values of E, G, $S_u$, $f_s$ and $q_{bu}$ etc., can also be determined for a site with similar geological conditions from subsurface exploration using any of the in-situ tests (SPT, CPT, CPTu, DMT, PMT or any other tests) without necessarily performing the subsurface investigation with any more load tests on short model piles. Many researchers have reported that the laboratory test results do not always represent the correct values for in-situ soils, that is there is some difference in the values. In such cases the laboratories values can also be corrected based on the load tests on short model piles. Note: Some publications use the word "Subsurface investigation" while many other publications use the word "Subsurface exploration", these two words can be interpreted to mean the same.

For driven piles in cohesionless soil stratum (sands and non-plastic silts), there are several methods to theoretically determine the value of $f_s$. In this application, only one or two such methods will be discussed.

Basically, the side friction ($f_s$) for cohesionless soils (sands, gravels, gravelly sands and non-plastic silts) is computed as:

$$f_s=\sigma'_v K \tan \delta \quad (11)$$

where: K=Coefficient of lateral earth pressure ranging from $K_o$ to about 1.75 depending on initial density and volume displacement etc. Values close to $K_o$ are generally recommended, because of long-term soil creep effects even where pile has large volume, and $\delta$=effective friction angle between soil and pile material, its values generally range from 17° to 29°.

$$K_o=(1-\sin \phi)OCR^{0.5} \quad (12)$$

where OCR=over consolidation ratio=(pre-consolidation vertical stress/vertical stress at that depth). When the value of $f_s$ is determined from the $f_s$ versus relative settlement curves (Δ) obtained from the load tests on short model piles, the correct value of K tan δ can be back calculated from the above equation.

Generally, $K_o$ is equals to K, the reasonable value of δ can be determined for each soil type and pile material from the load tests on model piles, after determining the value of $K_o$. Then the correct value of ϕ can also be back-calculated from above theoretical equations.

However, instead using the above theoretical approach, most of the time, empirical correlations are used. One such method is the Meyerhof Method (AASHTO, 2012), as given below:

$$\text{For driven displacement piles: } f_s=N'I_{60}/25, \text{ For non-displacement Piles: } f_s=N'I_{60}/50 \quad (13)$$

Where: $N'I_{60}$=representative SPT blow count near the pile tip (base) corrected for vertical pressure,
$D_b$=depth of penetration in bearing strata, d=pile diameter or width,
$N'=C_N N$, where: $C_N=[0.77 \log 10 (40/\sigma'_v)]$, N=SPT Blow Count, $\sigma'_v$ in ksf, NOTE: 1 ksf=47.8803 kPa $$q_{bu}=0.8(N'I_{60})D_b/d \leq q_t, \quad (14)$$

where $q_{bu}$=8 times the value of $N'I_{60}$ for sands and 6 times the value of $N'I_{60}$ for non-plastic silts.

E=0.056 $N'I_{60}$ for silts, sandy silts, slightly cohesive mixtures, E=0.097 $N'I_{60}$ for clean fine to medium sands, and slightly silty sands, E=0.139 $N'I_{60}$ for clean sands and sands with little gravel, and E=0.167 $N'I_{60}$ for sandy gravel and gravels.

The drained friction angle (ϕ') based on N-values is determined as (Brown et al. 2010):

$$\phi'=(15.4 N'I_{60})^{0.5}+20° \text{ or } \phi'=27.5+9.2 \log [N'I_{60}] \quad (15)$$

The drained friction angle (ϕ') based on cone tip resistance ($q_c$) is determined as (Brown et al. 2010):

$$\phi'=\tan^{-1}[0.1+0.38 \log\{q_c/\sigma'_v\}] \quad (16)$$

In laboratory, the value of ϕ' is generally determined from triaxial compression or direct shear tests on disturbed or recompacted specimen and then its value has been correlated generally with N-values or $q_c$ values. The Load Test on the short model pile using axial loading with the constant rate of displacement per minute for sandy soil should represent a triaxial compression test in in-situ condition, the lateral pressure on the short model pile representing the in-situ horizontal stress. Therefore, like laboratory triaxial compression test, the value of ϕ can also be determined from the in-situ triaxial compression tests on short model pile. In this way, all the present correlations of ϕ developed from SPT, CPT, CPTu, PMT, DMT etc. can be corrected or modified using the value of ϕ from in-situ compression tests with constant rate of displacement on short model piles performed at various depths of the soil deposit. All the above correlations for $f_s$, $q_{bu}$, E, ϕ, δ etc., developed from SPT, CPT, CPTu, DMT, and PMT etc. can be corrected or modified based on the results of the load test on the short model pile either using incremental loading method or constant rate of displacement per minute. Also, such new correlations can be used to determine engineering properties of soils from any of the above-mentioned in-situ tests conducted at the same or other sites with similar geologic conditions. After, the values of $f_s$, $q_{bu}$ and E determined from the load tests on the short model pile at various depths of the soil deposit, can be used to determine load-settlement behavior of the full-length production piles and drilled shafts, using the method of Gupta (2012, 2013 and 2015).

Teachings of this Application

The various aspects of what is described in the above sections, can be used alone or in other combinations for other type of tests. The teaching of this application is not limited to the tests, but it may have other applications. Therefore, teaching of the present application has numerous advantages and uses. It should be noted that the teaching of this application is not limited to the tests described in this application. It should therefore be noted that this is not an exhaustive list and there may be other advantages and uses which are not described herein.

Although the teaching of the present application has been described in detail for purpose of illustration, it is understood that such detail is solely for that purpose, and variations can be made therein by those skilled in the art without departing from the scope of the teaching of this application. Features described in the preceding description/specification may be used in combination other than the combinations explicitly described. Whilst endeavoring in the forgoing specification/description to draw attention to those features of the invention believed to be of particular importance, it should be understood that Applicant and Inventor claims protection in respect of any patentable feature or combinations of features hereinbefore referred to and/or shown in the drawings/figures whether or not particular emphasis has been placed thereon. The term "comprising" as used in the claims does not exclude other elements or steps. The term "a" or "an" as used in the claims does not exclude plurality. A unit or other means may fulfill the functions of several units or means recited in the claims.

REFERENCES

AASHTO (2102), AASHTO LRFD Bridge Design Specifications, American Associate of State Highway and Transportation Officials, Washington, D.C., USA.

ASTM Standards (2007), Standard Test Method for Piles Under Static Axial Compressive Load, ASTM D 1143/D 1143 M-07e1, *American Society of Materials*, Philadelphia, Pa., USA.

ASTM Standards (2012) Standard Test Method for Electric Friction Cone and Piezocone Penetration Testing of Soils. ASTM Designation: D5778-12, *American Society of Materials*, Philadelphia, Pa., USA.

Baguelin, F., and Jezequel, J. F. (1978), "French Self Boring Pressuremeters;" Proceedings of the Symposium on Site Exploration in Soft Ground Using InSitu Techniques, Alexandria, Va., USA.

Bowles, J. E. (1988), Foundation Analysis and Design, McGraw-Hill Book Company, New York, USA.

Brown, D, A., Turner, J. P. and Castelli, R. I. (2010), "Drilled Shafts: Construction Procedures and LRFD Design Methods." N.H.I. Course No. 132014, National Highway Institute, U.S. Department of Transportation, Federal Highway Administration, Washington, D.C., USA.

Gupta, R. C., (2012), "Hyperbolic Model for Load Tests on Instrumented Drilled Shafts on Instrumented Drilled Shafts in Intermediate Geomaterials and Rock", J. Geotechnical Engineering, Vol. 138, No. 11, 1407-1414, Reston, Va. 20191, USA.

Gupta, R. C., (2013), "Load-Settlement Behavior of Drilled Shafts in Multilayered Deposits of Soils and Intermediate Geomaterials", Geotechnical Testing Journal, ASTM International, Vol. 36, No. 5, 725-741, Reston, Philadelphia, Pa. 19428, USA.

Gupta, R. C., (2015), Discussion of "Instrumented Static Load Test on Rock-Socketed Micropile by H. Seo, M., Prezzi, and R. Salgado", J. Geotechnical Engineering, Vol. 141, No. 6, 07015001-2-07015001-6, Reston, Va. 20191, USA.

Gupta, R. C. (2016). "Expandable Jacket and its Calibration Device for Triaxial Tests on Soils," U.S. Pat. No. 9,383, 346 B2, United States Patent and Trademark Office, Alexandria, Va. 22313, U.S.A.

Gupta, R. C. (2017). "Test Device for Determining Three-Dimensional Consolidation Properties of Solis," U.S. Pat. No. 9,546,940 B2, United States Patent and Trademark Office, Alexandria, Va. 22313, U.S.A.

Gupta, R. C. (2018). "Expandable Jacket for Triaxial, Unconfined and Uniaxial Compression Tests and Test Device for Determining Three-Dimensional Consolidation and Settlement Tests," U.S. patent Ser. No. 10/060, 898 B2, United States Patent and Trademark Office, Alexandria, Va. 22313, U.S.A.

Lambe, T. W. and Whitman, R. V. (1969), Soil Mechanics, John Wiley & Sons, Inc., New York, USA Menard, L. (1956), "An Apparatus for Measuring the strength of Soils in Place, M.Sc. Thesis, University of Illinois, Urbana, Ill., USA.

Kezdi, A (1957), Bearing Capacity of Pile and Pile Groups", Proceedings of the Fourth Int. Conf. Soil Mech. Found. Engg., 2, London, 46-51.

Seed, H. B. and Reese, L. C. (1957), "The action of Soft Clay along Friction Piles;" Trans. Am. Soc. Civ. Eng., Vol. 122, 731-754.

Van der Veen, C. (1953). The Bearing Capacity of a Pile, Proceedings of the Third Int. Conf. Soil Mech Found. Engg., 2, 84-90.

Wroth, C. P. and Hughes, J. M. O. (1974), "The Development of a Special Instrument for the In-situ Measurement of Strength and Stiffness of Soils," Engineering Foundation Conference on Subsurface Exploration for Underground Excavation and Heavy Construction, N.E. College, Henniker, N.H., 295-311.

TABLE 1

Test Loads to Achieve Peak Side Friction and Base Resistance

| Diameter cm | Area of Cross-section Sq. cm | Perimeter cm | Length cm | Peak Test Load Side Friction kN | Peak Test Load Base Resistance kN | Total Test Load kN |
|---|---|---|---|---|---|---|
| 3.568 | 10 | 11.210 | 13.381 | 0.750 | 0.90 | 3.30 |
| 4.370 | 15 | 13.729 | 16.388 | 1.125 | 1.35 | 4.95 |
| 10 | 78.54 | 31.42 | 30 | 4.712 | 7.07 | 23.56 |
| 15 | 176.71 | 47.12 | 30 | 7.069 | 15.90 | 45.95 |
| 30 | 706.86 | 94.25 | 30 | 14.137 | 63.62 | 155.51 |
| 60 | 2827.43 | 188.50 | 30 | 28.274 | 254.47 | 565.49 |
| 100 | 7853.98 | 314.16 | 30 | 47.124 | 706.86 | 1507.96 |
| 10 | 78.54 | 31.42 | 60 | 9.425 | 7.07 | 32.99 |
| 15 | 176.71 | 47.12 | 60 | 14.137 | 15.90 | 60.08 |
| 30 | 706.86 | 94.25 | 60 | 28.274 | 63.62 | 183.78 |
| 60 | 2827.43 | 188.50 | 60 | 56.549 | 254.47 | 622.04 |
| 100 | 7853.98 | 314.16 | 60 | 94.248 | 706.86 | 1602.21 |
| 10 | 78.54 | 31.42 | 120 | 18.850 | 7.07 | 51.84 |
| 15 | 176.71 | 47.12 | 120 | 28.274 | 15.90 | 88.36 |
| 30 | 706.86 | 94.25 | 120 | 56.549 | 63.62 | 240.33 |
| 60 | 2827.43 | 188.50 | 120 | 113.097 | 254.47 | 735.13 |
| 100 | 7853.98 | 314.16 | 120 | 188.496 | 706.86 | 1790.71 |
| 10 | 78.54 | 31.42 | 180 | 28.274 | 7.07 | 70.69 |

TABLE 1-continued

Test Loads to Achieve Peak Side Friction and Base Resistance

| Dia-meter cm | Area of Cross-section Sq. cm | Peri-meter cm | Length cm | Peak Test Load Side Friction kN | Peak Test Load Base Resistance kN | Total Test Load kN |
|---|---|---|---|---|---|---|
| 15 | 176.71 | 47.12 | 180 | 42.412 | 15.90 | 116.63 |
| 30 | 706.86 | 94.25 | 180 | 84.823 | 63.62 | 296.88 |
| 60 | 2827.43 | 188.50 | 180 | 169.646 | 254.47 | 848.23 |
| 100 | 7853.98 | 314.16 | 180 | 282.743 | 706.86 | 1979.20 |

Notes:
1 kip per sq. ft = 47.8803 kN/m$^2$ (kPa),
1 inch = 2.54 cm,
1 kN = 224.8 lb.
Ultimate Side Friction = 50 kN/m$^2$
Ultimate Base Resistance = 900 kN/m$^2$

TABLE 2

Test Loads to Achieve Peak Side Friction and Base Resistance

| Dia-meter cm | Area of Cross-section Sq. cm | Peri-meter cm | Length cm | Peak Test Load Side Friction kN | Peak Test Load Base Resistance kN | Total Test Load kN |
|---|---|---|---|---|---|---|
| 3.568 | 10 | 11.210 | 13.381 | 1.500 | 1.80 | 6.60 |
| 4.370 | 15 | 13.729 | 16.388 | 1.125 | 2.70 | 7.65 |
| 10 | 78.54 | 31.42 | 30 | 4.712 | 14.14 | 37.70 |
| 15 | 176.71 | 47.12 | 30 | 7.069 | 31.81 | 77.75 |
| 30 | 706.86 | 94.25 | 30 | 14.137 | 127.23 | 282.74 |
| 60 | 2827.43 | 188.50 | 30 | 28.274 | 508.94 | 1074.02 |
| 100 | 7853.98 | 314.16 | 30 | 47.124 | 1413.72 | 2921.68 |
| 10 | 78.54 | 31.42 | 60 | 9.425 | 14.14 | 47.12 |
| 15 | 176.71 | 47.12 | 60 | 14.137 | 31.81 | 91.89 |
| 30 | 706.86 | 94.25 | 60 | 28.274 | 127.23 | 311.02 |
| 60 | 2827.43 | 188.50 | 60 | 56.549 | 508.94 | 1130.97 |
| 100 | 7853.98 | 314.16 | 60 | 94.248 | 1413.72 | 3015.93 |
| 10 | 78.54 | 31.42 | 120 | 18.850 | 14.14 | 65.97 |
| 15 | 176.71 | 47.12 | 120 | 28.274 | 31.81 | 120.17 |
| 30 | 706.86 | 94.25 | 120 | 56.549 | 127.23 | 367.57 |
| 60 | 2827.43 | 188.50 | 120 | 113.097 | 508.94 | 1244.07 |
| 100 | 7853.98 | 314.16 | 120 | 188.496 | 1413.72 | 3204.42 |
| 10 | 78.54 | 31.42 | 180 | 28.274 | 14.14 | 84.82 |
| 15 | 176.71 | 47.12 | 180 | 42.412 | 31.81 | 148.44 |
| 30 | 706.86 | 94.25 | 180 | 84.823 | 127.23 | 424.12 |
| 60 | 2827.43 | 188.50 | 180 | 169.646 | 508.94 | 1357.17 |
| 100 | 7853.98 | 314.16 | 180 | 282.743 | 1413.72 | 3392.92 |

Notes:
1 kip per sq. ft = 47.8803 kN/m$^2$ (kPa),
1 inch = 2.54 cm,
1 kN = 224.8 lb.
Ultimate Side Friction = 100 kN/m$^2$
Ultimate Base Resistance = 1800 kN/m$^2$

The invention claimed is:

1. A method for subsurface exploration or investigation to determine load-settlement behavior of deep foundations and engineering properties of soils and intermediate geomaterials, the method for the subsurface exploration or investigation comprises:
   (i) Performing load tests on a short model pile at various depths of a soil deposit by applying loads in load increments to determine a curve for side friction versus relative settlement between the soil and the short model pile and the curve for base resistance versus base settlement; wherein thereafter, to determine the load-settlement behavior of the deep foundations and to determine the engineering properties of the soils and the intermediate geomaterials by back-calculating using theoretical concepts and analyses of the curves for the side friction versus the relative settlement and the base resistance versus the base settlement; wherein in geotechnical engineering, values of the engineering properties determined by the back-calculations are considered to be most accurate;
   (ii) wherein the short model pile comprise either a pile made of a column or a beam section with or without an end plate, or a hollow or a solid pre-cast pile reinforced concrete, prestressed or without any prestress, or a cast-in-place reinforced concrete or grout pile, or a drilled shaft or a micro-pile, or a monotube pile; wherein type of the pile or deep foundation for the short model pile is selected based on the type of the pile or the deep foundation to be used for a project;
   (iii) wherein because drill rods, casings and pipe sections act as the column or the beam sections during the load test, therefore, the drill rods, the casings and the pipe sections have been designated as the column or the beam sections;
   (iv) wherein the short model pile also comprises either a cone or a piezocone penetrometer or a dilatometer blade.

2. The method for the subsurface exploration or investigation to determine the load-settlement behavior of the deep foundations and the engineering properties of the soils and the intermediate geomaterials in accordance with claim 1, the method for the subsurface exploration or investigation further comprises:
   (i) wherein the loads are applied at top of the beam or the column section; wherein the short model pile is connected at the end of the beam or the column section;
   (ii) wherein depending on a test depth, the beam or the column section to another beam or column section or sections are connected to each other to extend the short model pile to the test depth;
   (iii) wherein longitudinal reinforcements of the precast reinforced concrete or the cast-in-place reinforced concrete or cement grouted cast-in-place pile working as the short model pile protrude out of the top of concrete or grout and fastened to a plate;
   (iv) wherein the column or the beam section is connected to the plate; wherein depending on the test depth, the beam or column section to another beam or column section or sections are connected to each other to extend the short model pile to the test depth.

3. The method for the subsurface exploration or investigation to determine the load-settlement behavior of the deep foundations and the engineering properties of the soils and the intermediate geomaterials in accordance with claim 1, the method for the subsurface exploration or investigation further comprises:
   (i) wherein the load tests on the short model piles to be performed either using (a) a hydraulic jack acting against an anchored reaction frame, or (b) the hydraulic jack acting against a weighted box or a platform, or (c) direct loading on the short model pile using the weighted box or the platform;
   (ii) wherein for the direct loading on the short model pile, either a first method using a setup comprising the platform, cross beams, test beams and a bearing plate, cribbing with wedges is used or a second method comprising the bearing plate to be placed on the top of the top beam or column section is used;
   (iii) wherein for the second method of the direct loading, the bearing plate works as the platform; wherein as an option to reinforce the bearing plate, the bearing plate is weld connected to a plurality of gusset plates;

(iv) wherein as an option to further reinforce the bearing plate and for the bearing plate and the beam or the column section to act together, the gusset plates are weld connected with the top beam or column section;

(v) wherein the weights are placed in the load increments on the top of the bearing plate and settlements on the top beam or the column section and corresponding load increment readings are recorded;

(vi) wherein as an option the pipe section extending to a selected distance in to the ground is placed around the top beam or column section for increasing its lateral stability;

(vii) wherein when a CPT truck or an open CPT rig is used for advancing the short model pile during the load test, cone rods act as the column or the beam section with the short model pile connected with the bottom of the cone rods;

(viii) wherein according to the second method of the direct loading, the bearing plate with or without gusset plates is mounted on the cone rods to act as the platform for performing the load test either inside the CPT truck or on the open CPT rig;

(ix) wherein like a CPT truck, a mobile weighted box or platform, which is movable on a plurality of legs and each leg supported on inflatable tires or un-inflatable tires or mounted on tracked vehicle shall also be used for performing the load test on the short model piles.

4. The method for the subsurface exploration or investigation to determine the load-settlement behavior of the deep foundations and the engineering properties of the soils and the intermediate geomaterials in accordance with claim 1, the method for the subsurface exploration or investigation further comprises:

(i) wherein the short model piles are either instrumented or not instrumented to determine the load-settlement behavior of the deep foundations of the project;

(ii) wherein for measuring the settlement, either dial gages, or digital gages, or strain gages or LVDTs with or without an option of directly transferring the data to a computer or by remote control to a distant computer are to be used;

(iii) wherein the instrumentation comprises either the strain gages, or the LVDTs or tell tales with or without the option of directly transferring the data to the computer or by remote control to the distant computer;

(iv) wherein for measuring the applied load, either the dial gage, or the digital gage, or a load cell with or without the option of directly transferring the data to the computer or by remote control to the distant computer are used.

5. The method for the subsurface exploration or investigation to determine the load-settlement behavior of the deep foundations and the engineering properties of the soils and the intermediate geomaterials in accordance with claim 1, the method for the subsurface exploration or investigation further comprises:

(i) wherein when soft to very soft soils cannot support the weight of the beam or the column section or cannot support the weight of hammer which is placed on the top of the top beam or column section during testing, a hung balance is used to hang the beam or the column section and the second method of the direct loading method is to be used for performing the load on the short model pile;

(ii) wherein for the soft to very soft also, the short model pile is attached at the bottom of the beam or the column section;

(iii) wherein the hung balance is itself hung from a boom of drill rig or a crane or from the platform;

(iv) wherein when a base plate of the platform is resting on the ground, the base plate of the platform is anchored by anchors in the soil for its lateral stability;

(v) wherein when the beam or column sections with the short model pile are hanging from the hung balance, only self-weight of the beam and column section and the platform is recorded by the hung balance, till the short model pile does not contact and rest on the bottom of a drilled hole.

6. The method for the subsurface exploration or investigation to determine the load-settlement behavior of the deep foundations and the engineering properties of the soils and the intermediate geomaterials in accordance with claim 5, the method for the subsurface exploration or investigation further comprises:

(i) wherein when a CPT truck is used to advance the short model pile, the cone rods act as the column or beam section with the short model pile connected at the bottom of the cone rods;

(ii) wherein the second method of the direct loading is used and the bearing plate with or without gusset plates is mounted on the cone rods to act as a platform for performing the load test either inside the CPT truck or on the open CPT rig;

(iii) wherein when the load test is performed from the ground surface, base of the platform is placed on the ground surface and is provided with a plurality of anchor piles to prevent it from tilting when the load increments are applied;

(iv) wherein when the load test is being performed from a boat or ship, (preferably, but not necessary from a jacked-up boat or ship), the hung balance is hung from a crane or from the platform when the base plate of the platform is provided with attachments to prevent it from tilting.

7. The method for the subsurface exploration or investigation to determine the load-settlement behavior of the deep foundations and the engineering properties of the soils and the intermediate geomaterials in accordance with claim 1, the method for the subsurface exploration or investigation further comprises:

(i) Wherein to determine the curve for the side friction versus the relative settlement between the short model pile and the soil or intermediate geomaterials, the hollow short model pile which has a small wall thickness with a small annular area compared to an outside area is used; wherein to determine the base resistance versus the base settlement of the short model pile, the solid pile comprising either the beam or the column section with end plate or the monotube with the end plate or the solid pre-cast pile reinforced concrete, prestressed or without any prestress, or the solid cast-in-place reinforced concrete or grout pile, or the solid drilled shaft or the solid micro-pile shall be used;

(ii) wherein when the short model piles are instrumented, then it is not necessary to determine two separate load tests, one on the hollow short model pile and another on the solid short model pile, because the analyses of data obtained from the instrumentation assists in determination of the curve for the side friction versus the relative settlement between the short model pile and the soil or intermediate geomaterials and the curve for the base resistance versus the base settlement.

8. A method for subsurface exploration or investigation to determine load-settlement behavior of deep foundations and engineering properties of soils and intermediate geomaterials, the method for subsurface exploration or investigation comprises:
(i) Performing load tests on short model piles at various depths of a soil deposit using a constant rate of penetration to determine a curve for side friction versus relative settlement between the soil and the short model pile and the curve for base resistance versus base settlement; wherein then to determine the load-settlement behavior of the deep foundations and to determine the engineering properties of the soils and the intermediate geomaterials by back-calculating using theoretical concepts and analyses of the curves for the side friction versus relative settlement and the base resistance versus base settlement; wherein in geotechnical engineering, values of the engineering properties determined by the back-calculations are considered to be most accurate;
(ii) wherein an axial load gradually increases with the constant rate of penetration; wherein both settlement and load readings are recorded and analyzed;
(iii) wherein the short model pile comprise either a pile made of a column or a beam section with or without an end plate, or a hollow or a solid pre-cast pile reinforced concrete, prestressed or without any prestress, or a cast-in-place reinforced concrete or grout pile, or a drilled shaft or a micro-pile, or a monotube pile; wherein type of the pile or the deep foundation for the short model pile is selected based on the type of the pile or the deep foundation to be used for a project;
(iv) wherein because drill rods, casings and pipe sections act as the column or the beam sections during the load test, therefore, the drill rods, the casings and the pipe sections have been designated as the column or the beam sections;
(v) wherein the short model pile also comprises either a cone or piezocone penetrometer or a dilatometer blade.

9. The method for the subsurface exploration or investigation to determine the load-settlement behavior of the deep foundations and the engineering properties of the soils and the intermediate geomaterials in accordance with claim 8, the method for the subsurface exploration or investigation further comprises:
(i) wherein the axial loads are applied at top of the beam or the column section; wherein the short model pile is connected at the end of the beam or column section;
(ii) wherein depending on a test depth, the beam or the column section to another beam or column section or sections are connected to each other to extend the short model pile to the test depth;
(iii) wherein longitudinal reinforcements of the precast reinforced concrete or the cast-in-place reinforced concrete or a cement grouted cast-in-place pile working as the short model pile protrude out of the top of concrete or grout and fastened to a plate;
(iv) wherein the column or the beam section is connected to the plate; wherein depending on the test depth, the beam or the column section to another beam or column section or sections are connected to each other to extend the short model pile to the test depth.

10. The method for the subsurface exploration or investigation to determine the load-settlement behavior of the deep foundations and the engineering properties of the soils and the intermediate geomaterials in accordance with claim 8, the method for the subsurface exploration or investigation further comprises:
(i) wherein when CPT or CPTu soundings are advanced at the constant rate of 1, or 2 or 5 cm per second, an instantaneous failure of the soil occurs; wherein when the triaxial compression tests are performed at the constant rate of displacement between 0.0001 (or 0.001 cm/minute or greater) and 1 cm/minute in upward vertical direction, the instantaneous failure of the soil does not occur and instead stress versus settlement curves are obtained from an elastic range to a pseudo-elastic range to peak stress conditions;
(ii) wherein for sandy soils a higher constant rate of penetration is used, whereas for clayey soils a lower constant rate of penetration is used;
(iii) wherein a loading device similar to one used for the CPT or CPTu soundings shall be used for performing the load tests on the short model piles, but with modification of advancing the short model pile at the constant rate of penetration between 0.0001 cm/minute (or 0.001 cm/minute or greater) and 1 cm/minute in vertically downward direction, in order to obtain the stress versus settlement curves from the elastic range to the pseudo-elastic range to the peak stress conditions.

11. The method for the subsurface exploration or investigation to determine the load-settlement behavior of the deep foundations and the engineering properties of the soils and the intermediate geomaterials in accordance with claim 10, the method for the subsurface exploration or investigation further comprises:
(i) wherein when a CPT truck is used to advance the short model pile, the cone rods act as the column or beam section with the short model pile connected at the bottom of the cone rods;
(ii) wherein depending on sizes and lengths of the short model pile and the soil conditions, it is possible that capacity of a loading device in the CPT truck or rig may not be sufficient to perform the load test on the short model pile to achieve the final test load;
(iii) wherein therefore, the loading device with its software which can produce the constant rate of penetration of the short model pile between 0.0001 cm/minute (or 0.001 cm/minute or greater) and 1 cm/minute in the downward direction shall be shall be used and placed under and against a loaded box or platform or against an anchored reaction frame, which has a load capacity required to apply the final test load on the selected short model pile.

12. The method for the subsurface exploration or investigation to determine the load-settlement behavior of the deep foundations and the engineering properties of the soils and the intermediate geomaterials in accordance with claim 8, the method for the subsurface exploration or investigation further comprises:
(i) wherein the short model piles shall be either instrumented or not instrumented to determine the load-settlement behavior of the deep foundations of a project;
(ii) wherein for measuring the settlement, either dial gages, or digital gages, or strain gages or LVDTs with or without an option of directly transferring the data to a computer or by remote control to a distant computer are to be used;
(iii) wherein for measuring the applied load, either the dial gage, or the digital gage, or a load cell with or without the option of directly transferring the data to the computer or by remote control to the distant computer are used.

13. The method for the subsurface exploration or investigation to determine the load-settlement behavior of the deep foundations and the engineering properties of the soils and the intermediate geomaterials in accordance with claim 8, the method for the subsurface exploration or investigation further comprises:
   (i) wherein the instrumentation comprises either the strain gages, or the LVDTs or tell tales with or without the option of directly transferring the data to the computer or by remote control to the distant computer;
   (ii) wherein in the instrumented piles, the instrumentation helps in separating side resistance, relative settlement between the soil and the short model pile, base resistance and base settlement from the applied test load and the measured settlement at the top of the top beam or column section at each increment of load.

14. The method for the subsurface exploration or investigation to determine the load-settlement behavior of the deep foundations and the engineering properties of the soils and the intermediate geomaterials in accordance with claim 8, the method for the subsurface exploration or investigation further comprises:
   (i) wherein to determine the curve for the side friction versus the relative settlement between the short model pile and the soil or intermediate geomaterials, the hollow short model pile which has a small wall thickness with a small annular area compared to an outside area is used; wherein to determine the base resistance versus the base settlement of the short model pile, the solid pile comprising either the beam or column section with end plate or the monotube with the end plate or the solid pre-cast pile reinforced concrete, prestressed or without any prestress, or the solid cast-in-place reinforced concrete or grout pile, or the solid drilled shaft or the solid micro-pile shall be used;
   (ii) wherein when the short model piles are instrumented, then it is not necessary to determine two separate load tests, one on the hollow short model pile and another on the solid short model pile, because the analyses of data obtained from the instrumentation assists in determination of the curve for the side friction versus the relative settlement between the short model pile and the soil or intermediate geomaterials and the curve for the base resistance versus the base settlement.

\* \* \* \* \*